United States Patent [19]

Suetake et al.

[11] Patent Number: 5,742,839
[45] Date of Patent: Apr. 21, 1998

[54] COPROCESSOR FOR PERFORMING AN ARITHMETIC OPERATION BY AUTOMATICALLY READING DATA FROM AN EXTERNAL MEMORY

[75] Inventors: Seiji Suetake; Koichi Hatta; Hideyuki Iino; Tatsuya Nagasawa, all of Kawasaki, Japan

[73] Assignee: Fujitsu Limited, Kawasaki, Japan

[21] Appl. No.: 11,762

[22] Filed: Feb. 1, 1993

[30] Foreign Application Priority Data

Jan. 30, 1992 [JP] Japan .................... 4-015566
Jan. 30, 1992 [JP] Japan .................... 4-015571

[51] Int. Cl.$^6$ ............................................ G06F 15/00
[52] U.S. Cl. .......................... 395/800; 395/421.03
[58] Field of Search .......................... 395/800, 375,
395/421.03; 364/131, 132, 228, 26.1

[56] References Cited

U.S. PATENT DOCUMENTS

| | | | |
|---|---|---|---|
| 4,777,594 | 10/1988 | Yones et al. | 395/587 |
| 4,837,678 | 6/1989 | Culler et al. | 395/380 |
| 4,912,635 | 3/1990 | Nishimukai et al. | 395/585 |
| 4,926,323 | 5/1990 | Baror et al. | 395/585 |
| 4,984,154 | 1/1991 | Hanatani et al. | 395/587 |
| 4,989,140 | 1/1991 | Nishimukai et al. | 395/800 |
| 5,008,812 | 4/1991 | Bhandarkar et al. | 395/569 |
| 5,010,477 | 4/1991 | Omoda et al. | 395/800 |
| 5,148,532 | 9/1992 | Narita et al. | 395/595 |
| 5,193,156 | 3/1993 | Yoshida et al. | 395/586 |
| 5,247,627 | 9/1993 | Murakami et al. | 395/583 |
| 5,430,884 | 7/1995 | Beard et al. | 395/800 |

*Primary Examiner*—Alyssa H. Bowler
*Assistant Examiner*—John Follansbee
*Attorney, Agent, or Firm*—Staas & Halsey

[57] ABSTRACT

A processor comprises a command storage unit for storing a plurality of commands and data received from outside the processor, a command interpreter for interpreting commands and data stored in the command storage unit, an address designator for designating a particular execution address of the storage unit according to a command interpreted by the command interpreter or to an operation start command, and an update selector for selecting whether or not to update the value of an execution address designated by the address designator according to a command interpreted by the command interpreter.

14 Claims, 21 Drawing Sheets

COPROCESSOR FOR PERFORMING AN ARITHMETIC OPERATION BY AUTOMATICALLY READING DATA FROM AN EXTERNAL MEMORY

BACKGROUND OF THE INVENTION

1. Field of the Invention

The present invention relates to an arithmetic and control unit for performing arithmetic and control operations, and in particular, to a processor independent from a CPU, for performing arithmetic operations by storing a command sequence in a buffer, reading the commands one by one therefrom, and sequentially executing them.

2. Description of the Related Art

When a microprocessor is operated, commands and relevant data are stored in an external memory such as a DRAM (Dynamic Random Access Memory). Then, the commands and data are read by the microprocessor and processed.

However a DRAM, conventionally used as an external memory, necessitates a long access time. For example, if commands stored in the DRAM are extracted one after the other, a long execution time is required to process the commands, thereby degrading the processing efficiency of the microprocessor.

As a means for preventing the degradation of processing efficiency of the microprocessor, there has been employed a technique where a command sequence stored in an external memory is sent to a high speed accessible memory provided in a microprocessor and then the command sequence is fetched by the microprocessor when executed.

The register for storing the command sequence is referred to as a "command buffer".

An example of a microprocessor of this type is shown in FIG. 1.

In the figure, reference numeral 1 is a microprocessor. The microprocessor 1 comprises an external input/output control circuit 2, a start flag and start address storage portion 3, an internal input/output control circuit 4, latches 5 and 6, a program pointer 7, a command buffer 8, an adder 9, an OR gate "OR" a decoder DEC, and selectors SEL1 and SEL2.

In the figure, IB is an internal bus, S and S' are select signals, A is an address signal, and CB-ADR and CB-W/R are signals for controlling data input and output between the command buffer 8 and the internal data bus IB.

FIG. 2 is a flow chart for explaining the operation of the related art reference. FIG. 3 is a timing chart for explaining the operation of the related art reference. After the microprocessor 1 is started (at step ST1), at step ST2 data of the start flag and the start address are received from the external data bus and then these data are sent to the internal data bus IB through the external input/output control circuit 2.

At step ST3, the start flag and the start address are latched in the start flag and start address storage portion 3. At step ST4, the processor determines whether or not the select signal S is active. When the select signal S is active (determined result is "YES"), at step ST5 the start address is sent to the program pointer 7. In contrast, when the select signal S is inactive (determined result is "NO"), at step ST6 the content of the program pointer is incremented. In other words, when the start flag or the output of the latch 5 (which receives the output of the decoder DEC) is active, the presence of the OR gate provides that the selector signal becomes active. Thus, the selector SEL1 selects the output of the start flag and start address storage portion 3 and sets the output to the program pointer 7. In contrast, when the signal which is sent to the OR gate "OR" is inactive, the select signal becomes inactive. Thus, the selector SEL1 selects the output of the adder 9, which is the value where the present value of the program pointer 7 is incremented, and sets the output to the program pointer 7.

At step ST7, with the address which is the content of the program pointer 7, the content of the command buffer 8 is read. At step ST8, the command being read is latched. At step ST9, the command is decoded by the decoder DEC. At that point, the selector SEL2 has selected the output of the program pointer 7.

At step ST10, the processor 1 determines the decoded result of step ST9. When the decoded command is a branch command (the result is "YES"), at step ST11 the select signal S' becomes active and the signal is sent to the latch 5. Thus, the latch 5 outputs the select signal S'. In addition, the decoder DEC sends the branch address to the internal data bus IB through the internal input/output control circuit 4. Thus, the branch address is stored in the start flag and start address storage portion 3 through the internal data bus IB. When the next clock pulse takes place, the branch address is set to the program pointer 7.

In contrast, when the determined command is not a branch command (the result is "NO"), at step ST12 the microprocessor 1 determines whether or not a plurality of clock pulses are required to execute the decoded command. When a plurality of clock pulses are required to execute the command (the result is "YES"), at step ST13 the select signal S' becomes active. In addition, the address of the next command is sent to the internal data bus IB. Thus, the next address is stored in the start flag and start address storage portion 3 through the internal data bus IB. When the next clock pulse takes place, the address is set to the program pointer 7.

In contrast, when the decoded command is a normal command, where a plurality of clock pulses are not required to execute the command, at step ST13 the select signal S' becomes active.

When the above-mentioned microprocessor executes a command, if a plurality of clock pulses or a branch is required to execute the command, the microprocessor operates the initial address and the select signal S so as to control the program pointer. Thus, the control of the microprocessor becomes complicated and the processing efficiency of signals representing wait and branch is deteriorated.

FIG. 3 is a timing chart for explaining the operation of the above-mentioned related art reference.

When the above-mentioned microprocessor 1 is started, it outputs a start address C1 to the external data bus. When the next clock pulse takes place, this start address is sent to the external input/output control circuit 2. With a delay of half the period of a clock pulse, the start address is sent to the internal data bus IB. With a further delay of half the period of a clock pulse (namely, one clock pulse after the external input/output control circuit 2 receives the start address C1 of the external data bus), the start address C1 is stored in the start flag and start address storage portion 3. When the next clock pulse takes place, the start address C1 is loaded to the program pointer. When the next clock pulse takes place, a command stored in the command buffer is stored in the latch 6 and then outputted (C1).

In the above-mentioned operation which is successively performed, it is assumed that at an address C2, for example, a two-cycle command is stored. In this case, while the command is being executed, an address C3 is sent to the internal data bus IB through the internal input/output control circuit 4. The address C3 is stored in the start flag and start address storage portion 3 as the start address. When the next clock pulse takes place, the address C3 is stored in the program pointer C3. Thus, the command buffer 8 is addressed and the address C3 is stored in the latch 6. When the next clock pulse takes place, the address C3 is outputted from the latch 6. At the address C2 a two-cycle command is stored, the program counter advances. To prevent that, while the program at the address C2 is being executed, it is determined whether or not the command is a two-cycle command. When the determined result is "YES", the command is executed from the address C3 once again. Thus, a two-cycle command is executed as a three-cycle command. In other words, since two waits rather than one wait take place, the execution speed is lowered. In addition, for a branch command, a similar control is performed. Thus, when a branch command is executed, three clock pulses are required.

On the other hand, when a general purpose processor is provided with functions for executing complicated operations at high speed, the cost performance (performance versus cost) of this processor is lowered. As a means for solving this problem, a technique where a dedicated processor for performing complicated operations is provided outside the general purpose processor is known. The processor which performs complicated processes in association with its host processor is referred to as a co-processor.

Conventionally, this co-processor sequentially receives data necessary for a relevant operation (such as a floating decimal point operation, a vector operation, or another high speed operation) from the host processor. While the co-processor is dedicatedly performing operations, the host processor can execute another process. Thus, the overall performance of the entire system can be improved.

However, in the conventional co-processor, since almost all data necessary for a relevant operation are received from the host processor, whenever the co-processor requires data, the host-processor must perform processes such as accessing data and sending it to the co-processor. Thus, the load imposed on the host processor is large.

SUMMARY OF THE INVENTION

An object of the present invention is to provide a processor for effectively processing signals representing wait and branch.

Another object of the present invention is to provide a processor for autonomously reading data necessary for performing a relevant operation from an external memory, so as to remarkably reduce the load imposed on a host processor and further improve the overall performance of the system associated with the processor.

The first aspect of the present invention is a processor, comprising a command storage means for storing a plurality of commands and data received from the outside of the processor, a command interpretation means for interpreting commands and data stored in the command storage means, an address designation means for designating a particular execution address of the storage means according to a command interpreted by the command interpretation means or to an operation start command, and an update selection means for selecting whether or not to update the value of an execution address designated by the address designation means according to a command interpreted by the command interpretation means.

The second aspect of the present invention is a processor, comprising a command storage means for receiving a particular command from a host processor and storing the command, the command having a code portion and an address portion, the code portion containing a code sequence for causing the processor to load a predetermined command and data from an external memory, the address portion containing information representing storage locations of the predetermined command and data in the external memory, a decode means for decoding the particular command, an address extraction means for extracting the address portion contained in the particular command according to the output of the decode means, a read control means for generating a memory address sequence according to information of the address portion being extracted and for reading a plurality of commands and data from the external memory according to the address sequence, a command storage means for storing a plurality of commands and data being read by the read control means, a command interpretation means for interpreting commands and data stored in the command storage means, an address designation means for designating a particular execution address of the storage means according to a command interpreted by the command interpretation means or to an operation start command, and an update selection means for selecting whether or not to update the value of an execution address designated by the address designation means according to a command interpreted by the command interpretation means.

These and other objects, features and advantages of the present invention will become more apparent in the light of the following detailed description of a best mode embodiment thereof, as illustrated in the accompanying drawings.

DESCRIPTION OF PREFERRED EMBODIMENTS

Figure 1:
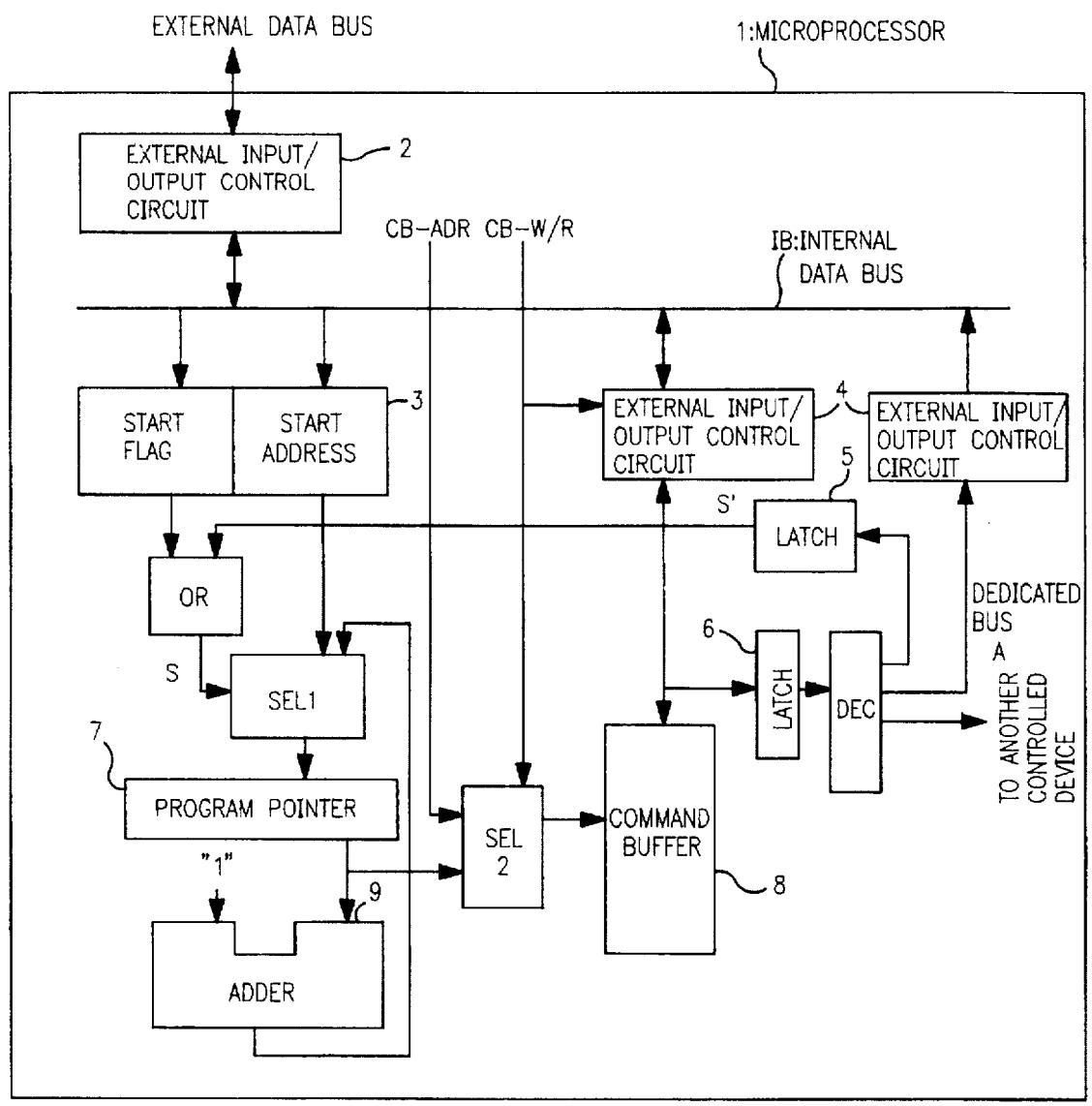
FIG. 1 is a block diagram showing the construction of the major portions of a related art reference.
Figure 2:
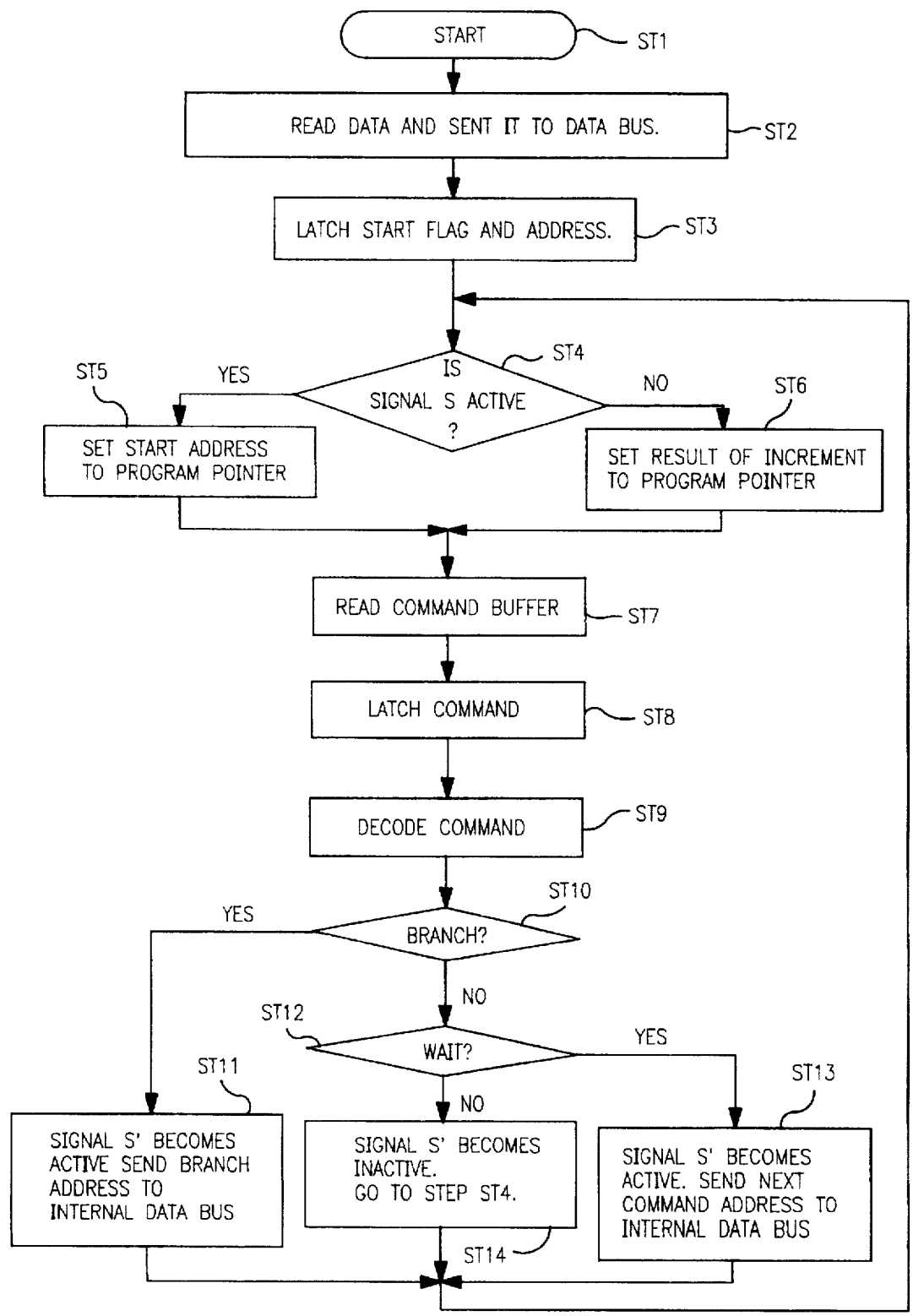
FIG. 2 is a flow chart for explaining the operation of the related art reference.
Figure 3:
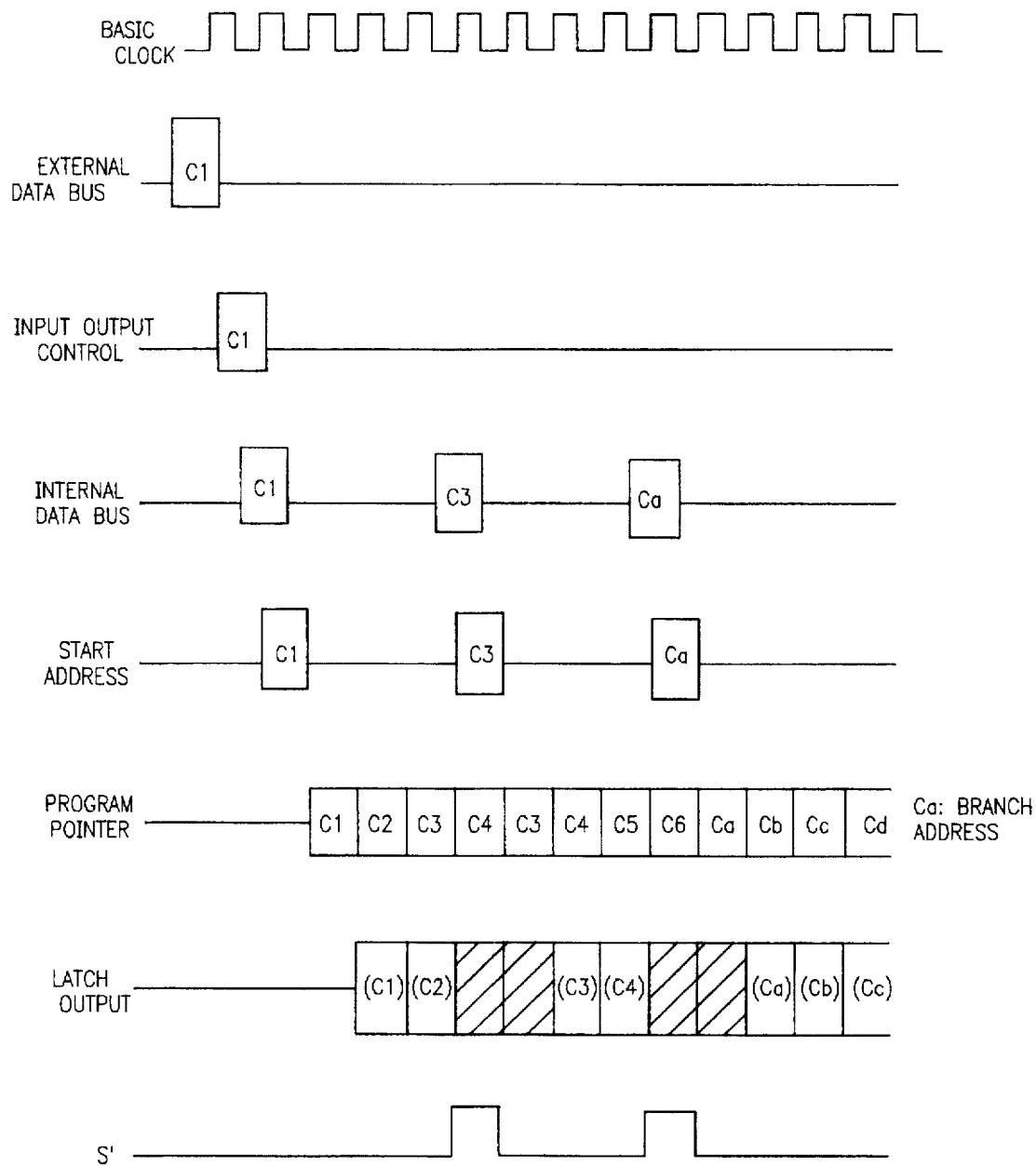
FIG. 3 is a timing chart for explaining the operation of the related art reference.
Figure 4:
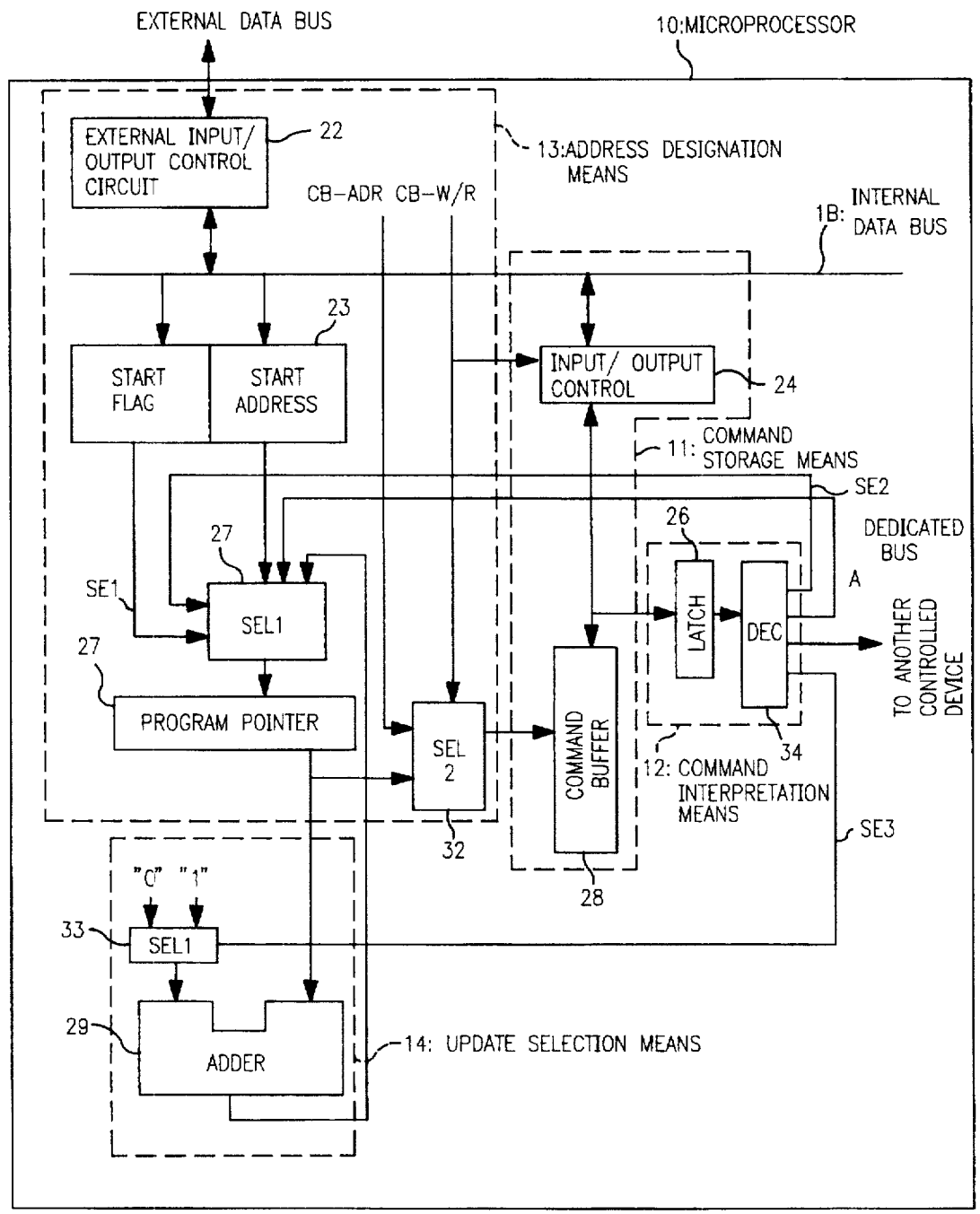
FIG. 4 is a block diagram showing the construction of major portions of a microprocessor of a first embodiment in accordance with the present invention.

FIG. 4 is a block diagram showing the construction of major portions of a microprocessor of a first embodiment in accordance with the present invention.

In the figure, reference numeral 10 is a microprocessor.

The microprocessor 10 in accordance with the present invention comprises a command storage means 11, a command interpretation means 12, an address designation means 13, and an update selection means 14. The command storage means 11 stores a plurality of commands and data received from the outside of the microprocessor 10. The command interpretation means 12 interprets commands and data stored in the command storage means 11. The address designation means 13 designates a particular execution address of the command storage means 11 according to a command interpreted by the command interpretation means 12 or to an operation start command. The update selection means 14 selects whether or not to update the value of an execution address designated by the address designation means 13 according to a command interpreted by the command interpretation means 12.

A particular execution address of the command storage means 11 is designated in accordance with a command interpreted by the command interpretation means 12 or an operation start command. The value of the execution address is updated by the update selection means 14 when necessary. In other words, even if a plurality of clock pulses or a branch is required to execute a command, signals representing the wait or branch are effectively processed.

Next, this embodiment will be described in detail.

As described above, the microprocessor 10 comprises the command storage means 11, the command interpretation means 12, the address designation means 13, and the update selection means 14. The command storage means 11 comprises an internal input/output control circuit 24 and a command buffer 28. The command interpretation means 12 comprises a latch 26 and a decoder (DEC) 34. The address designation means 13 comprises an external input/output control circuit 22, a start flag and start address storage portion 23, a program pointer 27, and selectors (SEL) 31 and 32. The update selection means 14 comprises an adder 29 and a selector (SEL) 33.

In addition, there is provided a command control circuit outside the microprocessor 10 (not shown in FIG. 4). The command control circuit sends and receives an interface signal to and from the microprocessor 10.

An internal data bus IB is a 32-bit bus on which data of the processor 10 are sent and received. CB-ADR and CB-W/R are signals used to control the input and output of data between the command buffer 28 and the internal data bus IB. In this embodiment, since the command buffer 28 has a storage capacity of 256 words, the length of the CB-ADR signal is eight bits.

The start flag and start address storage portion 23 is constructed of a one-bit register and an eight-bit register. The one-bit register stores a start flag which represents the start of execution of a command stored in the command buffer 28. The second register represents the address at which the first command to be executed is stored. This address is referred to as a start address. When the start flag is set to "1" (namely, becomes active), it represents the start of command execution. In the next cycle after the command is executed, the start flag is automatically set to "0".

The internal input/output control circuit 24 is for example a tri-state control circuit which inputs and outputs data from and to the internal data bus IB.

The program pointer 27 is an eight-bit register which represents the address of the command buffer 28 at which the next command to be executed is stored.

The command buffer 28 is a register which stores a command sequence and/or data. In this embodiment, the command buffer 28 is constructed of an SRAM of 32 bits×256 bytes. For example, when data is stored in the command buffer 28, a relevant command is stored in the command buffer 28 through the external input/output control circuit 22, the internal data bus IB, and the input/output control circuit 24. At this point, the CB-ADR signal is stored in the command buffer 28 through the selector 32. Thus, the command is stored in the command buffer 28.

The selector 31 is a circuit which selects data to be inputted to the program pointer 27. When the start flag is active, the selector 31 selects the start address. In contrast, when a branch signal is active, the selector 31 selects a branch address received through a dedicated bus A. Otherwise, the selector 31 selects the output of the adder 29. The the start flag and the branch signal are not both active at the same time.

The update selection means 14, which comprises the selector 33 and the adder 29, controls whether or not to update the content of the program pointer 27 while a command is being executed.

The selector 32 is a circuit which selects an address to be set to the command buffer 28. While the internal data bus IB is inputting or outputting data, the selector 32 selects the CB-ADR signal. When a storage address of a command is required, the selector 32 selects the value of the program pointer 27.

The start write signal is a write signal for both registers of the start flag and start address storage portion 23. When the start write signal is active, data on the internal data bus IB is written to both the registers.

The branch signal and the branch address are signals used for branching control of the microprocessor 10 in accordance with a branch command. When the control is branched, the branch signal becomes active. At this point, a branch address is received. The length of the branch address is eight bits.

Figure 5:
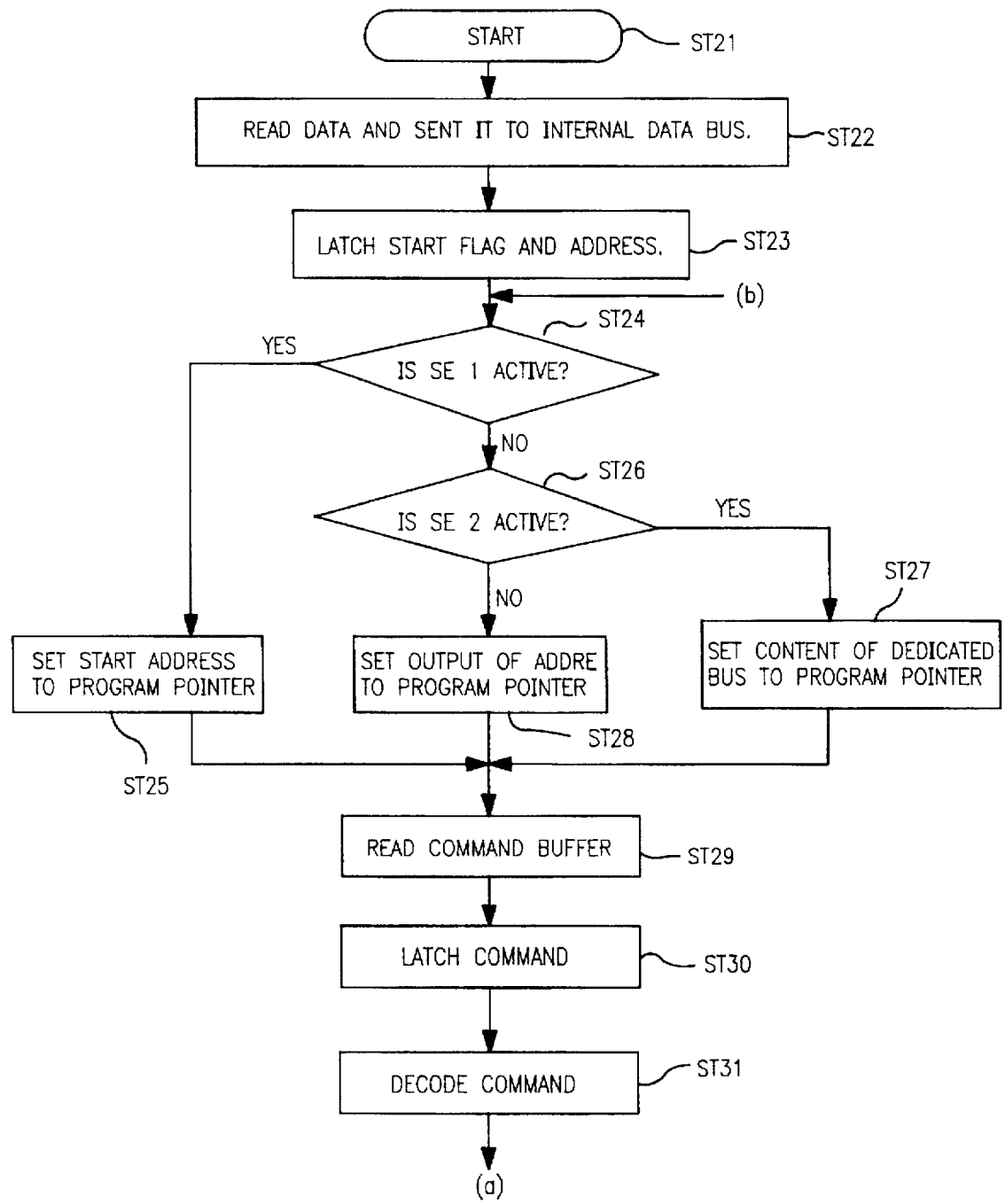
FIG. 5 is the first half of a flow chart for explaining the operation of the first embodiment in accordance with the present invention.
Figure 6:
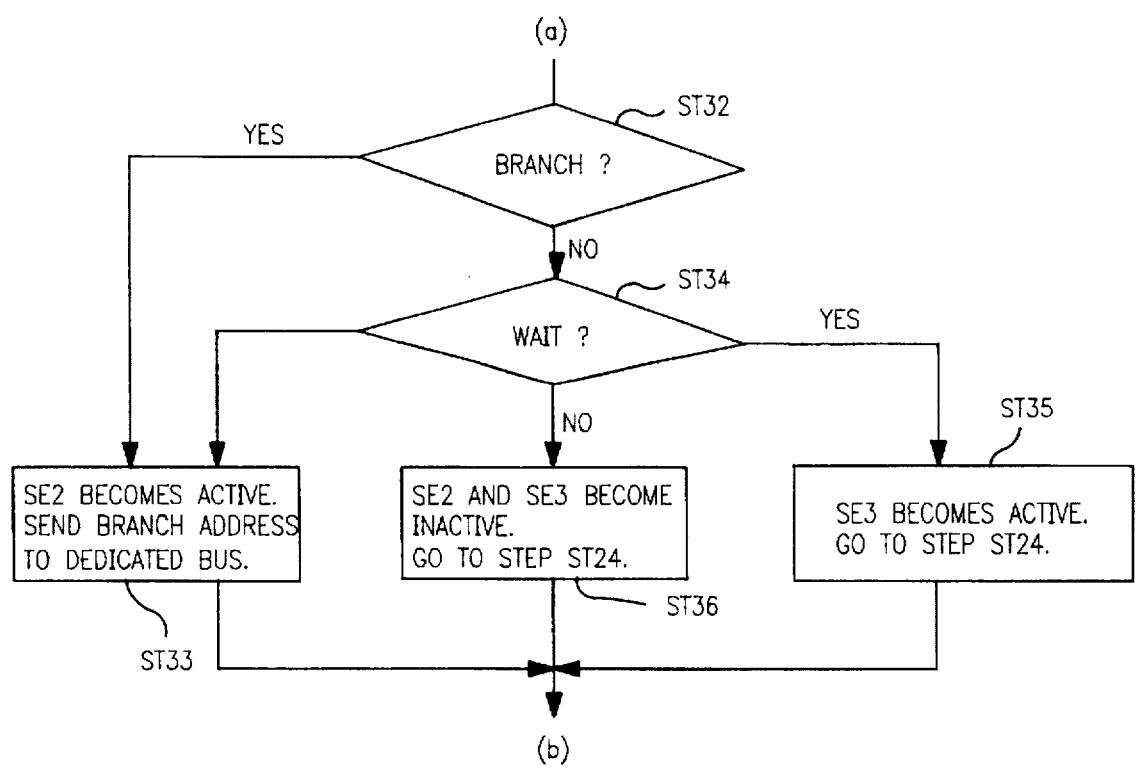
FIG. 6 is the second half of the flow chart of FIG. 5.
Figure 7:
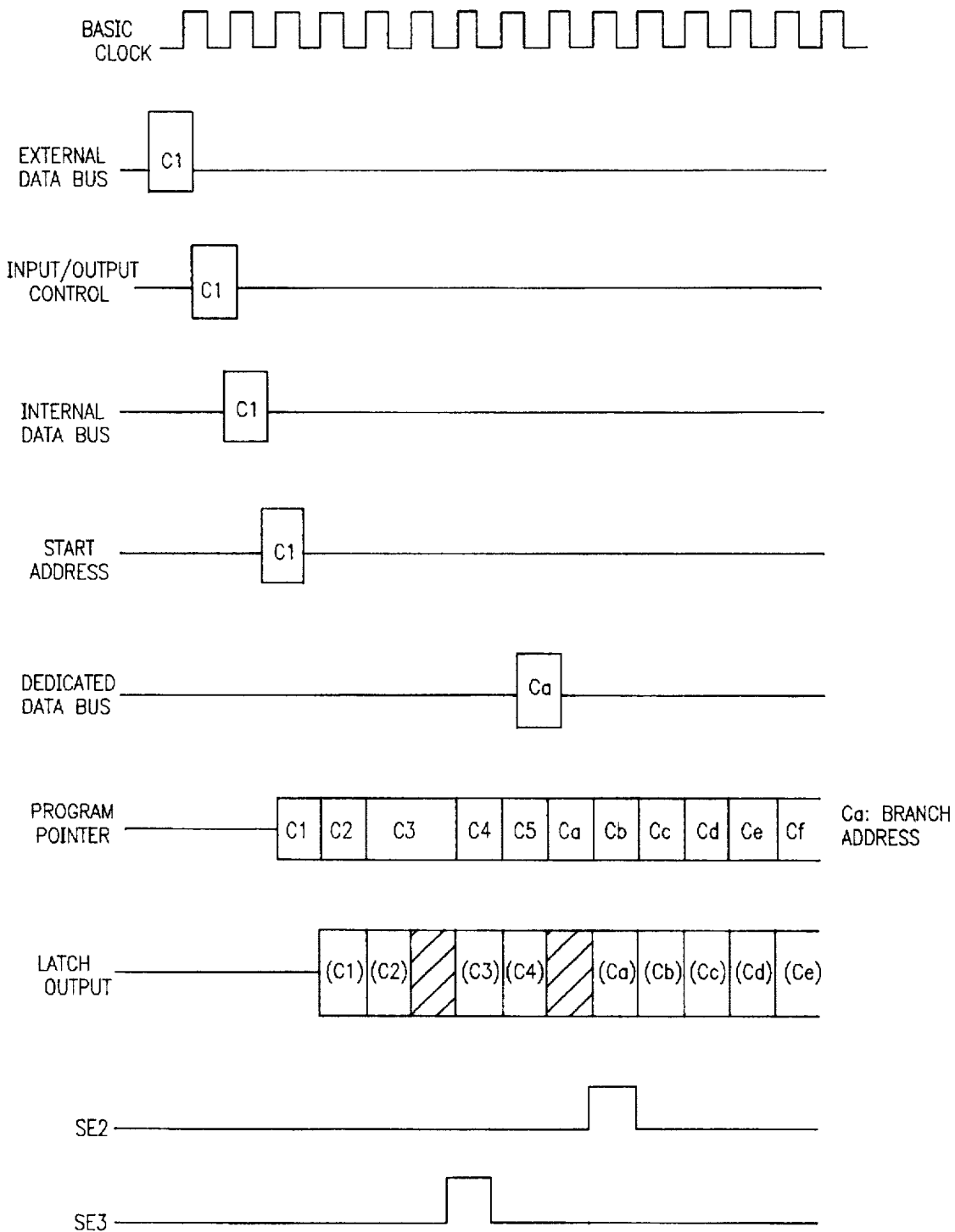
FIG. 7 is a timing chart for explaining the operation of the first embodiment in accordance with the present invention.

FIG. 7 is a timing chart for explaining the operation of this embodiment in accordance with the present invention. FIGS. 5 and 6 are flow charts for explaining the operation of this embodiment in accordance with the present invention. Letters (a) and (b) of FIGS. 5 and 6 represent connections of flows of these drawings.

At step ST21, the microprocessor 10 is started. At step ST22, data of the start flag and the start address are read from the external data bus. At step ST22, the data are sent to the internal data bus IB through the external input/output control circuit 22.

At step ST23, with the start write signal, the start flag and the start address are latched in the start flag and start address storage portion 23. At step ST24, the microprocessor 10 determines whether or not the select signal SE1 is active. If the select signal SE1 is active, at step ST25, the start address is sent to the program pointer 27. When the select signal SE1 is inactive and the select signal SE2 is active (at step ST27), the content of the dedicated bus "A" is sent to the program pointer 27. At steps ST24 and ST26 the microprocessor 10 determines whether or not the select signals SE1 and SE2 are active. At step ST28, the output of the adder 29 is sent to the program pointer 27 if SE1 and SE2 are both inactive.

At step ST29, the content of the command buffer 28 are read with the address which is the content of the program pointer 27. At step ST30, the command being read is latched by latch 26. At step ST31 the command is decoded by the decoder (DEC) 34.

At step ST32, the microprocessor 10 determines whether or not the result of the step ST31 is a branch command. When the decoded command is a branch command (at step ST33), the select signal SE2 becomes active and a branch address is sent to the dedicated bus "A". At step ST34 the microprocessor 10 determines whether or not a plurality of clock pulses are required to execute the decoded command. When the determined result of the step ST34 is "YES", at step ST35 the select signal SE3 becomes active. At this point, since the selector 33 selects "0", the value of the program pointer 27 is not incremented.

When the decoded command is a normal command, the determined result of the step ST34 is "NO". At step ST36, the select signals SE2 and SE3 become inactive.

When the select signals SE2 and SE3 are inactive, the selector 33 selects "1" and sends it to the adder 29. When the selector 33 selects "1", the adder 29 increments the output of the program pointer 27 by 1 and outputs it.

As described above, according to this embodiment, by the update selection means 14, which is an update means of the program pointer 27, the command buffer address according to each command can be effectively generated.

Figure 8:
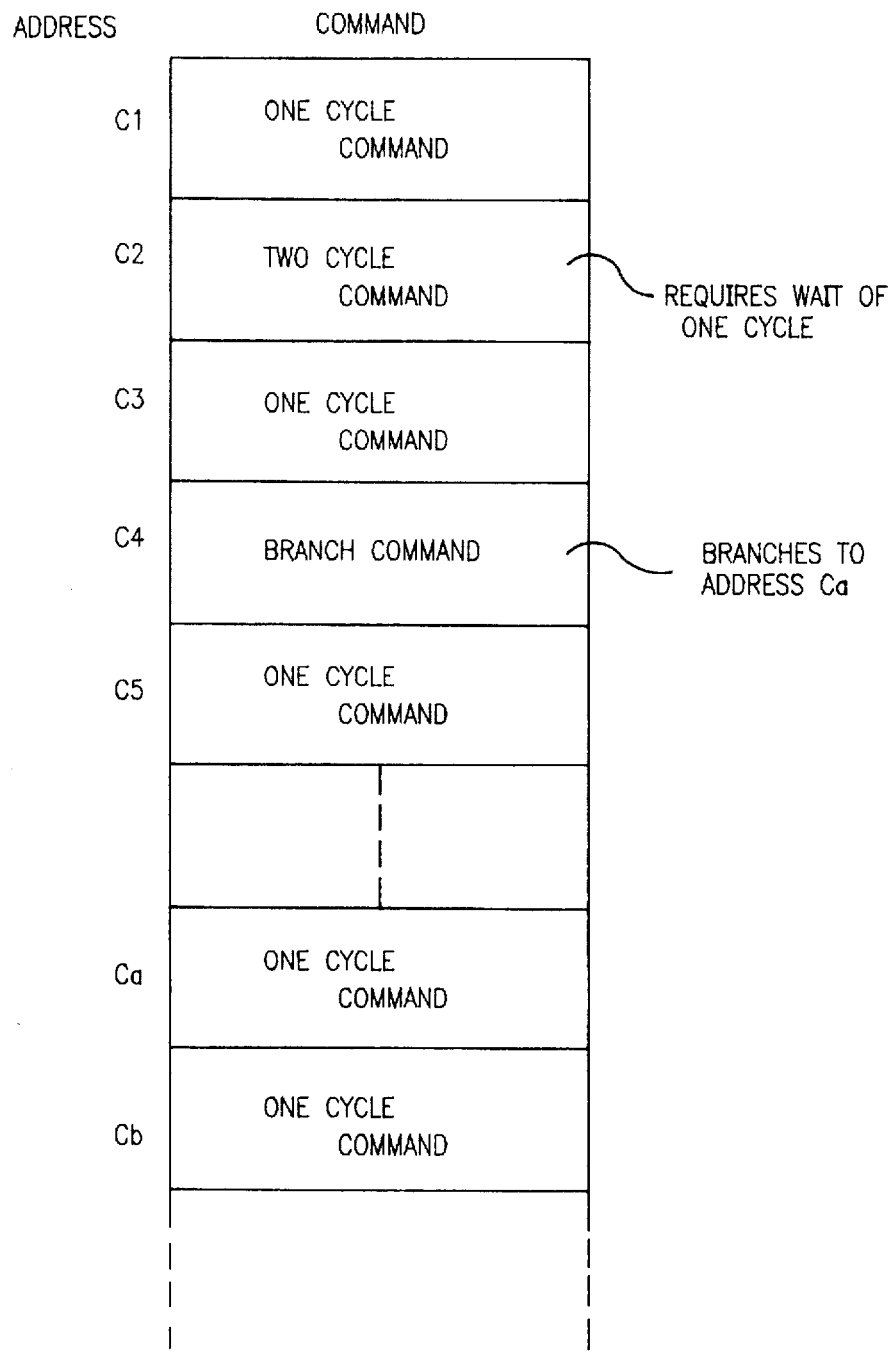
FIG. 8 is a schematic diagram for explaining a command buffer.

FIG. 7 is a timing chart for explaining the operation of the first embodiment in accordance with to the present invention. FIG. 8 is a schematic diagram for explaining a command buffer. As shown in FIG. 8, now assume that commands stored at addresses C1 and C3 are one-cycle commands, a command stored at address C2 is a two-cycle command, a command stored at address C4 is a branch command branched to address Ca.

In addition, assume that the microprocessor 10 executes these commands stored in the command buffer 28. At this point, the start address C1 is sent to the input/output control circuit 22 through the external data bus. When the next clock pulse takes place, the input/output control circuit 22 receives the start address C1. When the next clock pulse takes place, the input/output control circuit 22 sends the start address C1 to the internal data bus. When the next clock pulse takes place, the start flag and start address storage portion 23 receives the start address C1. Thus, the start address C1 is stored in the program pointer 27.

Commands are executed from the address received from the program pointer 27. The command buffer 28 outputs a command stored at the address C1 to the latch 26. When the next clock pulse takes place, the latch 26 receives the command and sends it to the decoder 34.

In this manner, commands are successively outputted. As shown in FIG. 8, when a command at address C2 is a two-cycle command, the select signal SE3 received from the decoder 34 becomes active. Thus, the selector 33 selects "0" and sends it to the adder 29. Thereby, the value of the program pointer 27 is not incremented and outputs the address C3. Thus, after the command at the address C2 is executed, the select signal SE3 becomes inactive. As a result, a command at the address C3 can be immediately executed. When the command at the address C3 is executed, the value of the program pointer 27 is incremented by 1, thereby outputting the address C4.

On the other hand, when a command at the address C4 is a branch command, the select signal SE2 becomes active. At this point, the decoder 34 outputs a branch address Ca through the dedicated bus A. The selector 31 selects the branch address Ca from the dedicated bus A. When the next clock pulse takes place, the selector 31 sends the branch address Ca to the program pointer 27. Since the command at the address C4 is a branch command, two cycles are required to execute it. In other words, two cycles or one wait later a branch command can be immediately executed. Thus, branch commands can be executed at high speed without waits.

Figure 9:
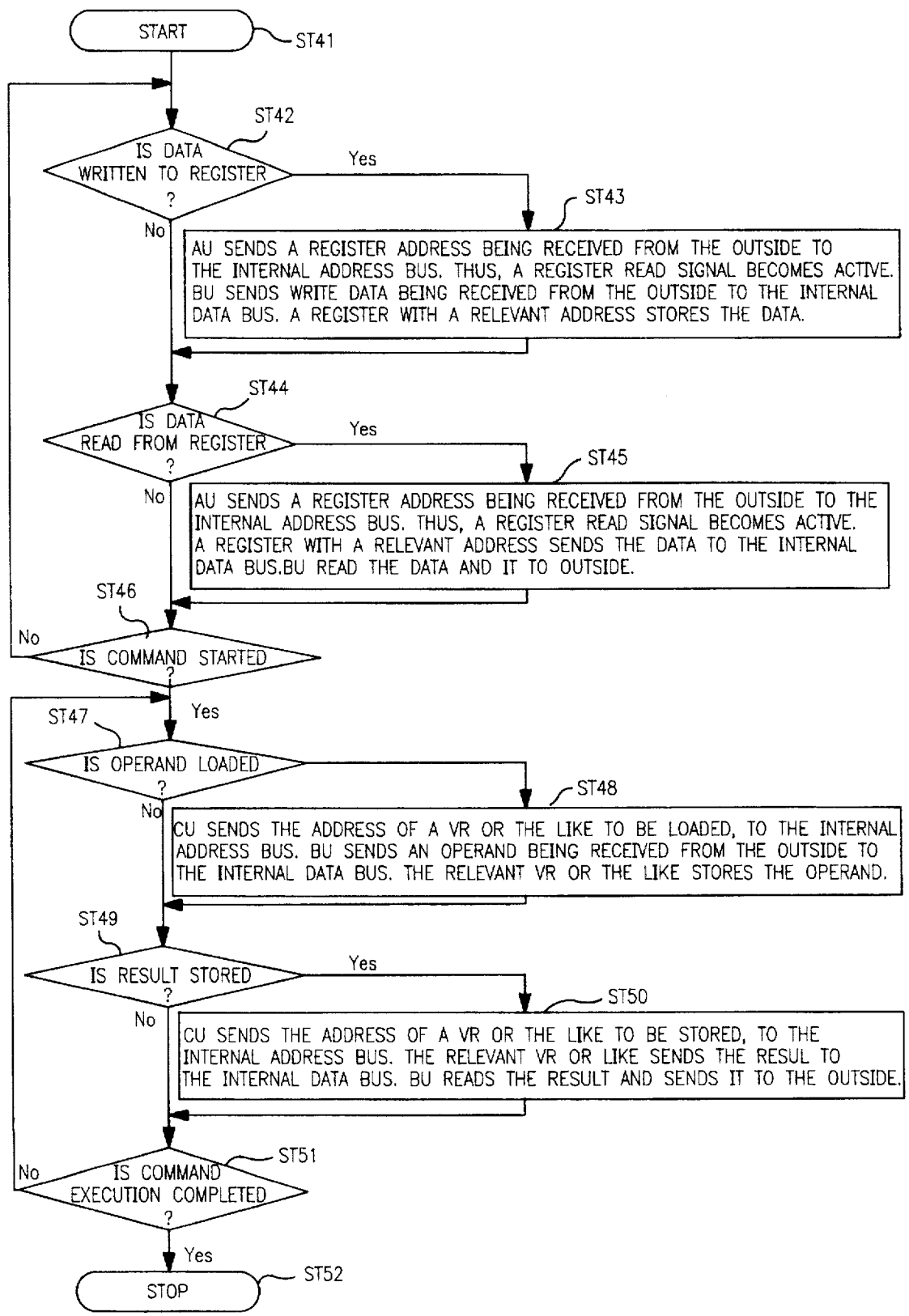
FIG. 9 is a flow chart for explaining the operation of the first embodiment in accordance with the present invention.

FIG. 9 is a flow chart of the operation of the microprocessor 10 of the first embodiment in accordance with the present invention. The process starts at step ST41. At step ST42, a controller (not shown in FIG. 4) determines whether or not data is written to a register. When data is written to a register (the result is "YES"), at step ST43 an address unit (AU) in the external input/output control circuit 22 outputs an internal register address received from the external bus to an internal address bus constructing the internal bus and thereby a signal representing a register write operation becomes active. At the same time, a bus control unit (BU) of the external input/output control circuit 22 sends the received write data to the internal data bus IB. Thus, the register with the relevant address receives the data. Examples of this register are the start flag and start address storage portion 23 and the command buffer 28. When the determined result is "NO" at step ST42, the step ST43 is skipped.

At step ST44, the controller determines whether or not data is read from a register. When data is read from a register (the result is "YES"), at step 45 the address unit (AU) sends a register address being received from the outside to the internal address bus and thereby a signal representing a register read operation becomes active. In addition, the register with the register address sent to the internal address bus sends data being stored to the internal data bus. The bus control unit (BU) sends the received data to the external bus through the external input/output control circuit 22. When the determined result is "NO" at step ST44, the step ST45 is skipped.

Next, at step ST46 the controller determines whether or not a command start has been inputted (that is, the start flag of the start flag and start address portion 23 has been set). When a command start has not been inputted (the result is "NO"), flow returns to the step ST42. With the above steps, after the microprocessor 10 of this embodiment is started (for example, after the power thereof is turned on), according to a command issued from an external unit, data is written/read to/from a register. Thus, the process can be initially set.

On the other hand, when the determined result is "YES" at step ST46, at step ST47 the controller determines whether or not an operand is loaded. When the determined result is "YES", at step ST48 the control unit (CU) of the microprocessor 10 outputs the address of a relevant register to the internal address bus. When the microprocessor 10 is a vector pipeline processor (VPU), the control unit (CU) outputs the address of a vector register to the internal address bus. The bus control unit outputs an operand received from the external bus to the internal data bus. Thus, the relevant register, for example the vector register, stores the operand. When the determined result is "NO" at step ST47, the step ST48 is skipped.

Next, at step ST49 the controller determines whether or not a result is stored. When the determined result is "YES", at step ST50 the control unit outputs the address of a vector register or the like to which data is stored to the internal address bus. The relevant register outputs the result to the internal data bus. Thereafter, the bus control unit receives the result from the register and sends it to the external bus. When the determined result is "NO" at step ST49, the step ST50 is skipped.

Next, at step ST51 the control unit determines whether command execution is completed. When the determined result is "NO", the flow returns to the step ST47. Thus, even if a command has a plurality of operands, it can be read at step ST48. When a command is completed, the result is outputted to the external circuit.

As described above, the microprocessor 10 of this embodiment is operated. The flow chart of FIG. 9 is for explaining the sequence of operation in each portion. The execution of a command is performed by the command interpretation means 12.

The operation of the first embodiment of the present invention can be summarized as follows. (1) When a plurality of clock pulses are required to execute a relevant command, "0" is sent to the adder 29 so that it stops incrementing the value of the program pointer 27. (2) When a branch command is executed, branch address is selected by the selector 31. The selector 31 sends the branch address to the program pointer 27.

Thus, even if a plurality of clock pulses or a branch is required to execute a command interpreted, signals representing waits and branches can be effectively processed.

In the first embodiment of the present invention, commands are sequentially stored in the command buffer 28 under the control of an external CPU. After the commands are stored, the microprocessor 10 executes these commands. However, it should be noted that the present invention is not limited to this operation. For example, by creating a command which causes a command sequence to be received from an external memory and then executed, a high speed process can be accomplished. Next, a microprocessor which executes such a command will be described.

Figure 10:
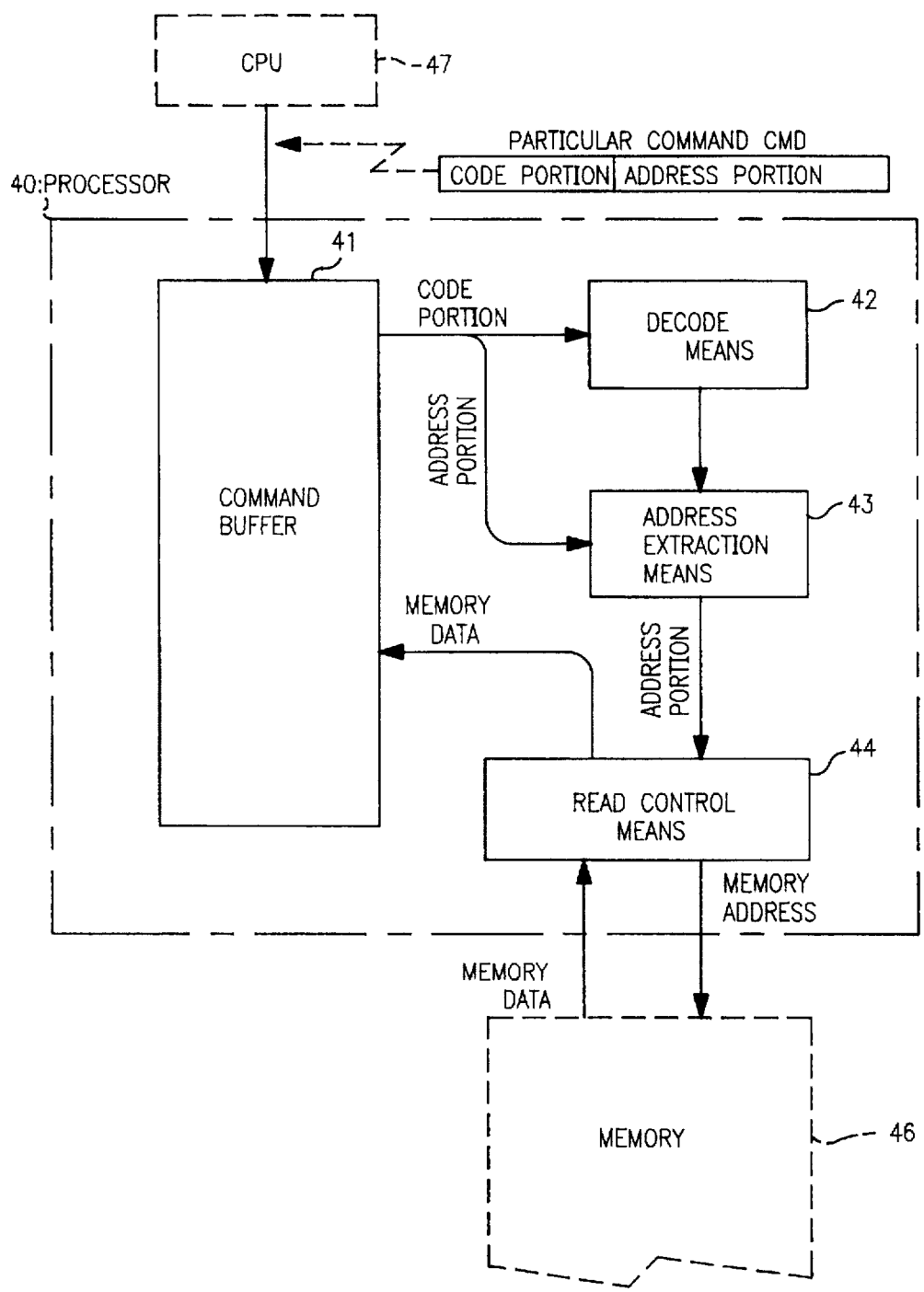
FIG. 10 is a block diagram showing the construction of a second embodiment in accordance with the present invention.

FIG. 10 is a block diagram showing the construction of a second embodiment in accordance with the present invention. In the figure, reference numeral 40 is a processor. The processor 40 comprises a command buffer 41, a decode means 42, an address extraction means 43, and a read control means 44. The command buffer 41 receives a particular command CMD from a host processor 47 and stores it. The command CMD consists of a code portion and an address portion. The code portion contains a code sequence which causes a command and data sequence to be loaded from an external memory 46. The address portion contains information representing the storage locations of the command and data sequence stored in the external memory 46. The decode means 42 decodes the particular command. The address extraction means 43 extracts the address portion contained in the particular command in accordance with the output of the decode means 42. The read control means 44 generates a memory address sequence in accordance with the information of the address portion being extracted. In addition, the read control means 44 reads a plurality of commands and data from the external memory 46 in accordance with the address sequence. The command buffer 41 stores the commands and data being read from the external memory 46 by the read control means 44.

The command buffer 41 sends the code portion and the address portion to the decode means 42 and the address extraction means 43, respectively. The decode means 42 decodes the codes which are received. When the received command is the above-mentioned particular command CMD, the decode means 42 extracts an address to be read from the address portion being sent to the address extraction means 43. In addition, the decode means 42 causes the address extraction means 43 to send the extracted address to the read control means 44. Thus, the read control means 44 receives the extracted address and accesses a particular region according to the address of the external memory 46. Thereafter, the external memory 46 outputs data to the read control means 44. The data is stored in the command buffer 41. The processor 40 is for example a co-processor. As described above, the processor 40 can store in the command buffer 41 commands and so forth which are in turn stored at particular regions of the external memory 46. Thus, when the host processor 47 sends a simple command to the processor 40, a plurality of commands can be stored in the command buffer 41. In other words, with one command sent from the host processor 47 to the processor 40, the processor 40 can sequentially execute a command sequence of commands one after the other.

When the host processor 47 sends a particular command to the processor (for example, co-processor) 40, the processor 40 autonomously reads from the external memory 46 commands and data necessary for executing a relevant operation. Thus, the load imposed on the host processor 47 is reduced, thereby further improving the overall performance of the system.

Next, the second embodiment of the present invention will be described in more detail.

Figure 11:
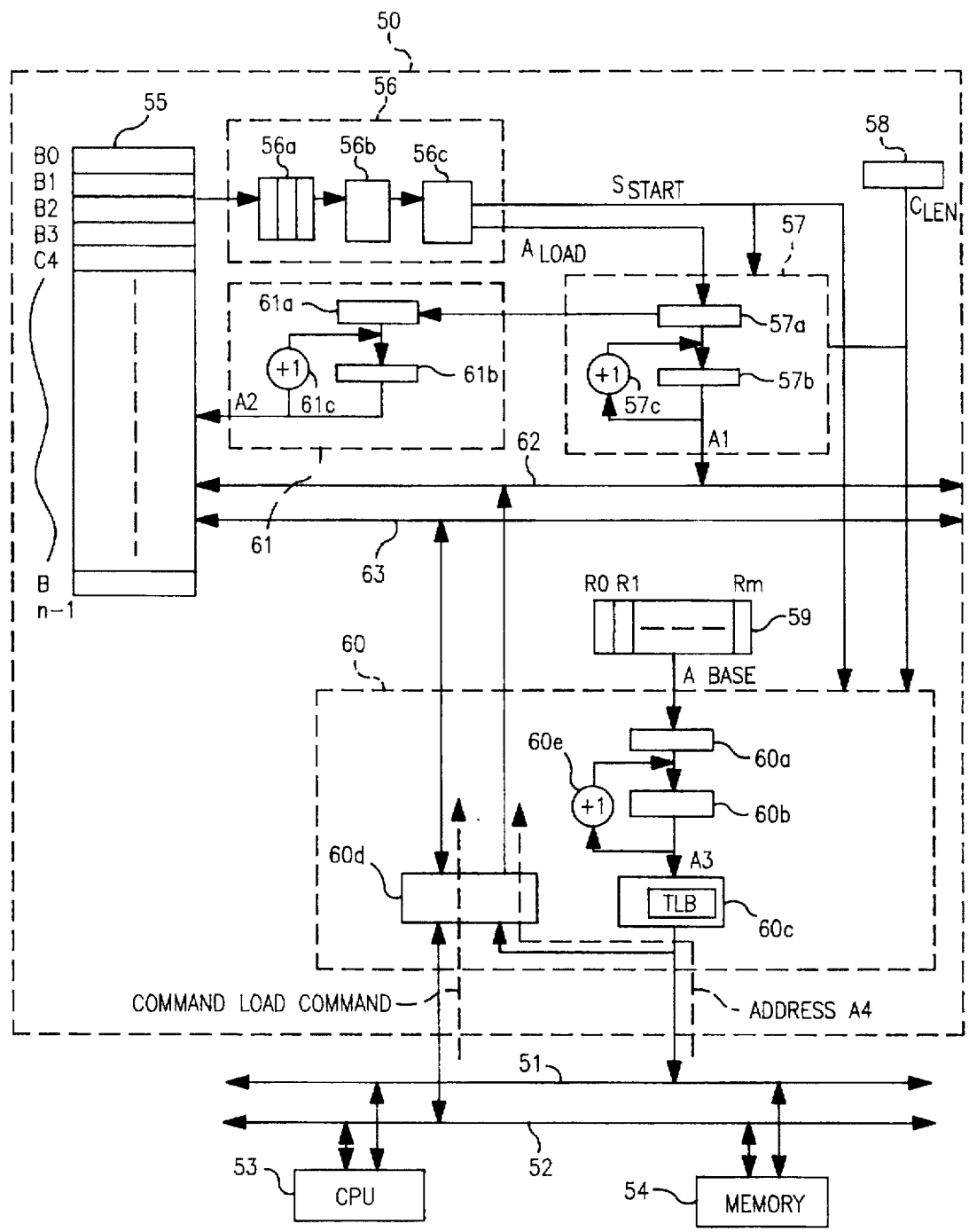
FIG. 11 is a detail schematic diagram showing the construction of the second embodiment in accordance with the present invention.

FIG. 11 is a detailed schematic diagram showing the construction of the processor of the second embodiment in accordance with the present invention.

In the figure, reference numeral 50 is a processor, for example a co-processor. The processor 50 is connected to a host processor (CPU) 53, an external memory 54, and so forth through an external address bus 51 and an external data bus 52. The processor 50 comprises a buffer circuit 55 (which is a command storage means 41), a decode circuit 56 (which is a decode means 42 and an address extraction means 43), a command load control circuit 57, a command length register 58, a general purpose register group 59, a bus control circuit 60 (which is a read control means 44), and a program pointer circuit 61.

The buffer circuit 55 can designate n regions $B_0$ to $B_{n-1}$ of memory space with particular address signals such as a first address signal $A_1$ and a second address signal $A_2$. In a region designated with the first address signal $A_1$, a particular command and data can be stored or read. In a region designated with the second address signal $A_2$, a particular command and data can be read.

The decode circuit 56 comprises a prefetch register 56a, a command decoder 56b, and a dispatch portion 56c. The prefetch register 56a stores a command being read from a region of the buffer circuit 55, the region being designated with the second address signal $A_2$. The command decoder 56b decodes the content of the prefetch register 56b. The dispatch portion 56c outputs various signals for clock operations such as a load start signal $S_{START}$ and a load address $A_{LOAD}$ in accordance with the decoded result by the command decoder 56b.

The command load control circuit 57 comprises an address register 57a and a pointer 57b. The address register 57a stores a load address $A_{LOAD}$. The pointer 57b has the contents of the register 57a as its initial value and increments the contents whenever a clock pulse takes place. The command load control circuit 57 sends the contents of the pointer 57b as the first address signal A1 to the buffer circuit 55 through an internal address bus 62. The output of the pointer 57b is sent to an incrementer 57c. The output of the incrementer 57c is sent to the pointer 57b. With this loop, whenever a clock pulse takes place, the content of the pointer 57b is incremented.

The command length register 58 stores information representing the number of commands and data to be loaded from the external memory 54. This information is referred to as a command length $C_{LEN}$. The general purpose register group 59 comprises m registers $R_0$ to $R_{m-1}$, each of which stores a base address $A_{BASE}$ which is information representing the storage location of a command or data stored in the external memory 54.

The bus control circuit 60 comprises a register 60a, a pointer 60b, an address translation 60c, and a slave access logic 60d. The register 60a reads and stores a base address $A_{BASE}$ stored in a register of the general purpose register group 59. The pointer 60b has the content of the register 60a as its initial value and increments the content whenever a clock pulse takes place. The address translation 60c outputs the content of the pointer 60b as the address of the external memory 54, that is, a third address signal $A_3$. The slave access logic 60d reads a command or data from the external memory 54 according to the third address $A_3$ and outputs it to the buffer circuit 55 through the internal data bus 63. The output of the pointer 60b is sent to an incrementer 60e. The output of the incrementer 60e is sent to the pointer 60b. With this loop, the content of the pointer 60b are incremented whenever a clock pulse takes place.

The address translation 60c also has a conversion table TLB. The pointer 60b generates a logical address. Using the conversion table TLB, the address translation 60c outputs a physical address A3 inputted into the address translation 60c. The conversion table TLB has for example information necessary for converting a logical address into a physical address. For example, 16 bits of a logical address are converted at a time. By inputting a logical address ID (LA-ID), a high order physical address (PA-NUMBER) is outputted. With this address and the low order logical address, the address translation 60c generates a total of 32 bits of a physical address A3.

The program pointer circuit 61 comprises a start register 61a and a pointer 61b. The start register 61a stores a particular start address $A_{START}$. The pointer 61b has the contents of the register 61a as its initial value and increments the contents whenever a clock pulse takes place. The program pointer circuit 61 sends the contents of the pointer 61b as a second address signal A2 to the buffer circuit 65. The output of the pointer 61b is sent to an incrementer 61c. The output of the incrementer 61c is sent to the pointer 61b. With this loop, the content of the pointer 61b are incremented whenever a clock pulse takes place.

Figure 12:
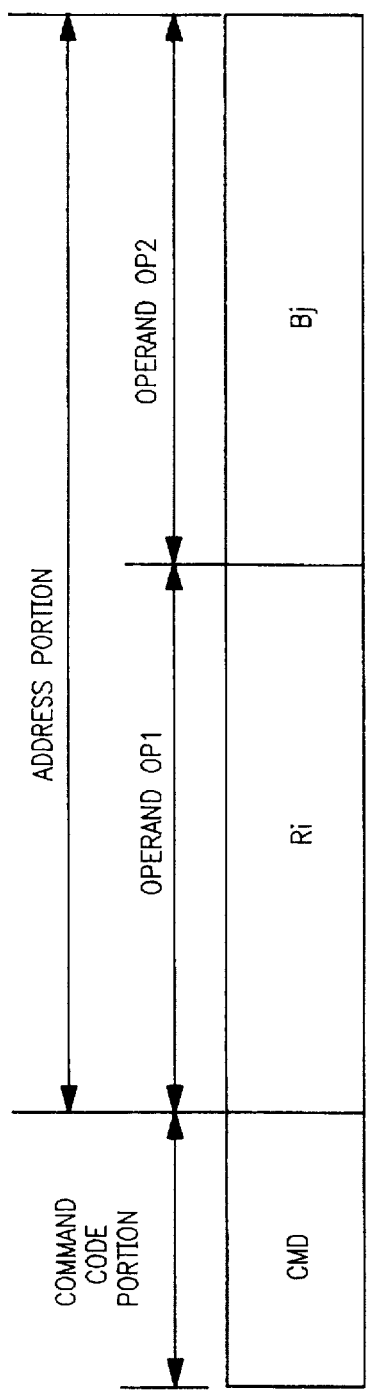
FIG. 12 is a schematic diagram showing the format of a particular command of the second embodiment in accordance with the present invention.

FIG. 12 is a schematic diagram showing the format of a particular command sent from the CPU 53 to the co-processor 50.

The command is composed of a command code portion CMD and an address portion. The address portion is composed of operands OP1 and OP2. The command code portion CMD is a code for commanding the co-processor 50 to load a particular command and data from the external memory 54. $R_i$ of the operand OP1 is the number of a register of the general purpose register group 59 for storing a base address $A_{BASE}$. $B_j$ of the operand OP2 is a load address $A_{LOAD}$.

By a slave access operation, a particular command sent from the CPU 53 to the co-processor 50 is stored at one region (address $B_{START}$) of the buffer circuit 55 according to a fourth address signal A4 (address $A_{START}$) designated by the external address bus 51. In addition, a command length $C_{LEN}$ is written to the command length register 58. A base address $A_{BASE}$ is written to a register $R_j$ of the general purpose register group 59. The command length $C_{LEN}$ and the address $A_{BASE}$ are set by for example the CPU 53.

The operand OP1 of a particular command is predesignated a register number $R_j$ of the general purpose register group 59. The operand OP2 of the command is predesignated an address representing a region $B_i$ of the buffer circuit 55, that is a load address $A_{LOAD}$.

After a particular command has been stored at an address $B_{START}$ of the buffer circuit 55 and a command length $C_{LEN}$ and a base address $A_{BASE}$ have been set, a region (start address) $B_{START}$ of the buffer circuit 55 is designated in accordance with the value of a second address signal A2, that is an initial address value $A_{START}$. Thereafter, a command in the region is read. Next, the command is decoded by the decode circuit 56. Since the command in the region of the address $B_{START}$ is a particular command which has been received from the CPU 53, the decode circuit 56 outputs the load start signal $S_{START}$ and the load address ALOAD, which is the content of the operand OP2 of the particular command. The load address $A_{LOAD}$ is set to the register 57a of the command load control circuit 57. On the other hand, the base address $A_{BASE}$ stored in the register $R_3$ of the general purpose register group 59 is set.

Thus, the value of the first address signal A1 is successively incremented, starting with the address $A_{LOAD}$, whereas the value of the third address signal A3 is successively incremented, starting with the address $A_{BASE}$. Each command and each data which is read from the external memory 54 in accordance with the third address signal A3 is successively written to each region of the buffer circuit 55 designated with the first address signal A1.

According to this embodiment, by executing a particular command which is received from the CPU 53, a command load system where data and commands necessary for executing a relevant operation are directly sent from the external memory 54 to the co-processor 50 can be accomplished.

Thus, since the CPU 53 does not necessitate such processes as accessing and sending data, the load imposed on the CPU 53 can be remarkably reduced. As a result, the CPU 53 can dedicatedly deal with another process, thereby further improving the overall performance of the system.

In addition, like a command group of a slave LSI such as the above co-processor, in a buffer without a write-back function, the control logic using the above command buffer system rather than a complicated control logic such as a cache can be simplified. Moreover, since the command buffer can be addressed under the control of the OS (Operating System), the program of the slave LSI can be easily managed.

Figure 13:
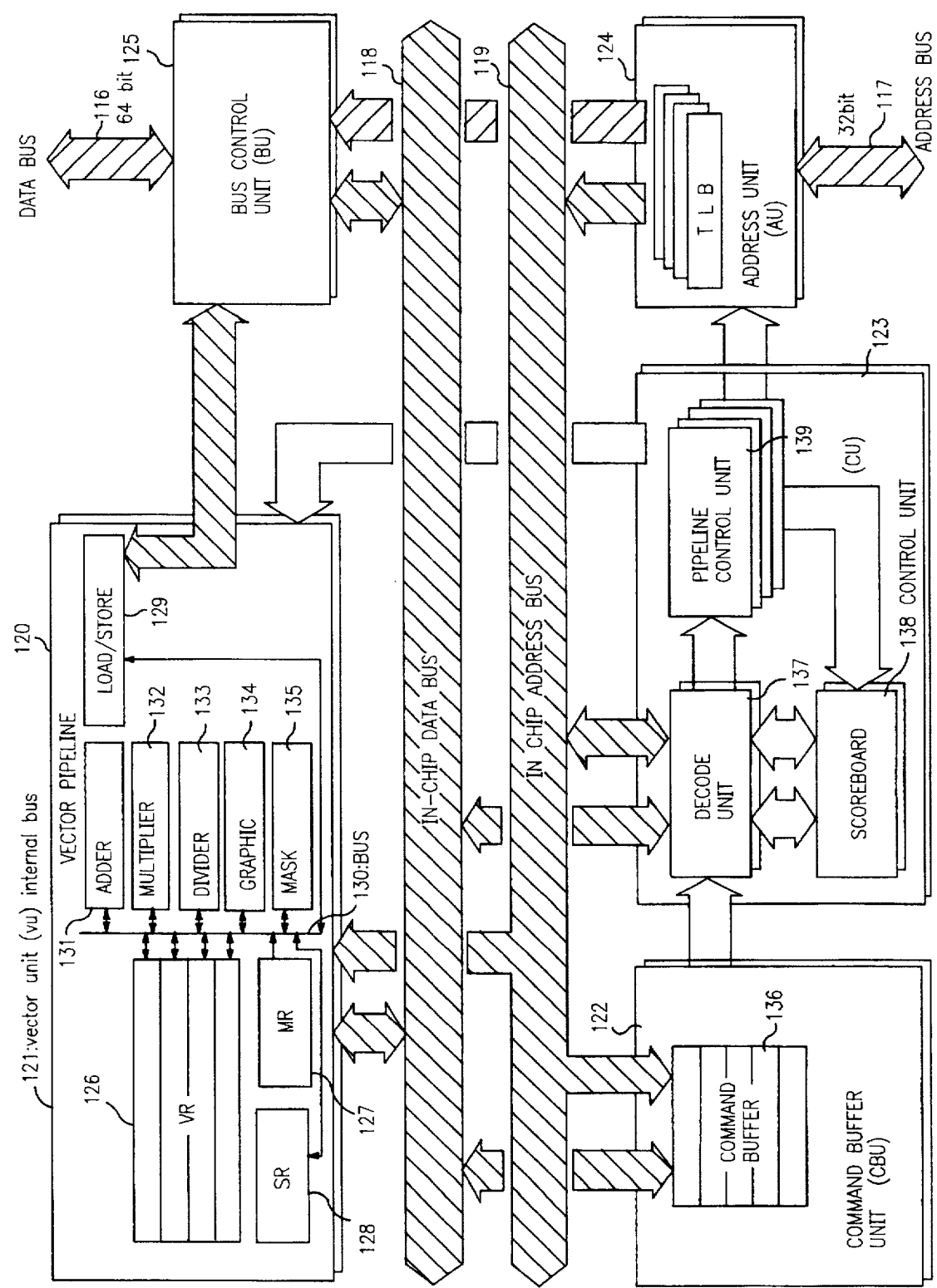
FIG. 13 is a block diagram of a vector processor unit.
Figure 14:
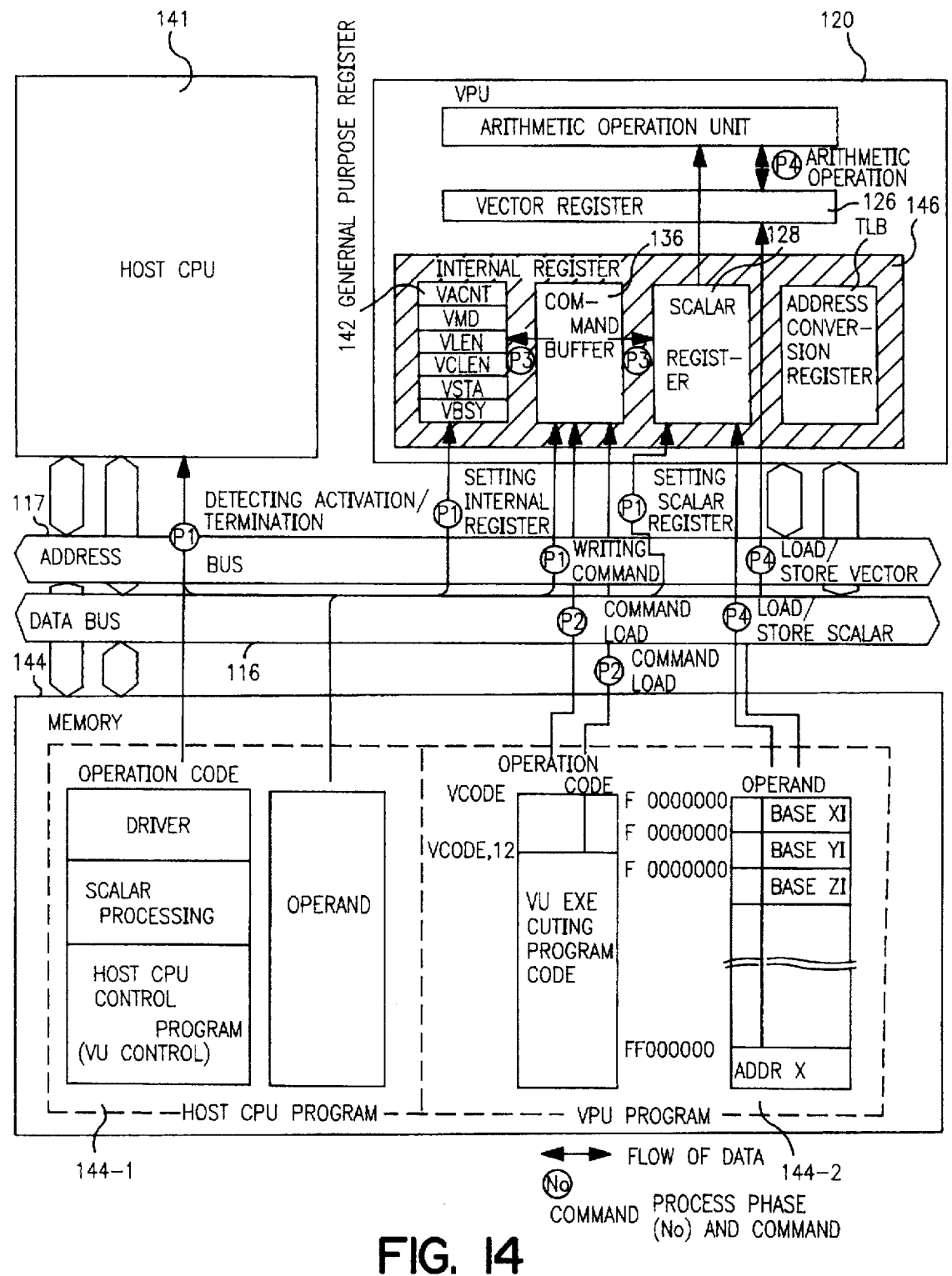
FIG. 14 is a block diagram of a computer system containing a vector processor unit.

Next, a vector processor unit according to the present invention will be described in detail. FIG. 13 is a block diagram showing the construction of a vector processor unit in accordance with the present invention. FIG. 14 is a block diagram of a computer system to which the vector processor unit 120 of FIG. 13 is connected.

The vector processor unit (VPU) 120 comprises a vector unit (VU) 121, a command buffer unit (CBU) 122, a control unit (CU) 123, an address unit (AU) 123, and a bus control unit (BU) 125. The vector unit (VU) 121 performs a vector operation. The command buffer unit (CBU) 122 has a command buffer 136 which stores a command sequence to be executed. The control unit (CU) 123 controls command execution such as decoding a command. The address unit (AU) 124 converts an address between an external address bus 117 and an internal address bus 119 (namely, an on-chip address bus) so as to access a memory or the like connected to the external bus. In addition, the address unit (AU) 124 generates an internal address used for setting an initial value of each register according to a command received from the outside. The bus control unit (BU) 125 controls interfacing between an external data bus 116 connected to an external unit such as an external memory and an internal data bus 118 (namely, an on-chip data bus).

As described above, the vector unit (VU) 121 is a unit which performs a vector operation. The vector unit (VU) 121 comprises an 8 KB vector register (VR) 126, a 64 byte mask register (MR) 127, a 128 byte scalar register (SR) 128, an adder 131, a multiplier 132, a divider 133, a graphic process circuit 134, a mask process circuit 135, and vector pipelines 129, each of which is connected with a bus 130 in the unit. The adder 131, the multiplier 132, and the divider 133 perform various arithmetic operations. An example of the vector pipeline 129 is a load/store pipe which stores/reads data to/from a register.

The control unit 123 causes a decode unit 137 to decode a command. A scoreboard 138 and a pipeline control unit 139 control the execution of a command.

The relation between the second embodiment and the vector processor unit is as follows. The buffer circuit 55 accords with the command buffer 136; the decode circuit 56 accords with the control unit 123; the command load control circuit 57 accords with one of the pipeline control units 139; the internal address bus 62 accords with the on-chip address bus 119; the internal data bus 63 accords with the on-chip data bus 118; the general purpose register group 59 accords with the scalar register 128 and the general purpose register 142; the external address bus 51 accords with the address bus 117; the external data bus 52 accords with the data bus 116; the CPU 53 accords with the host CPU 141; and the memory 54 accords with the memory 144.

The command buffer 41 is a command storage unit comprising, for example, a 1K-byte command buffer (VCB). A command set of the embodiment of the present invention is, for example, 32 bits long. Command strings read from an external unit are sequentially stored in a command buffer starting from a specified entry point. Since a command is stored to a command buffer entry, a total of 256 steps of command strings can be stored at a time.

In addition, the program pointer circuit 61 is provided in the command buffer unit (CBU) 122. The command length register 58 accords with the internal register (VCLEN) of the control unit. The slave access logic of the bus control circuit 60 accords with the bus control unit 123. The register 60a, the pointer 60b, the address translation 60c, and the incrementer 60e are provided in the address unit 124.

Figure 15:
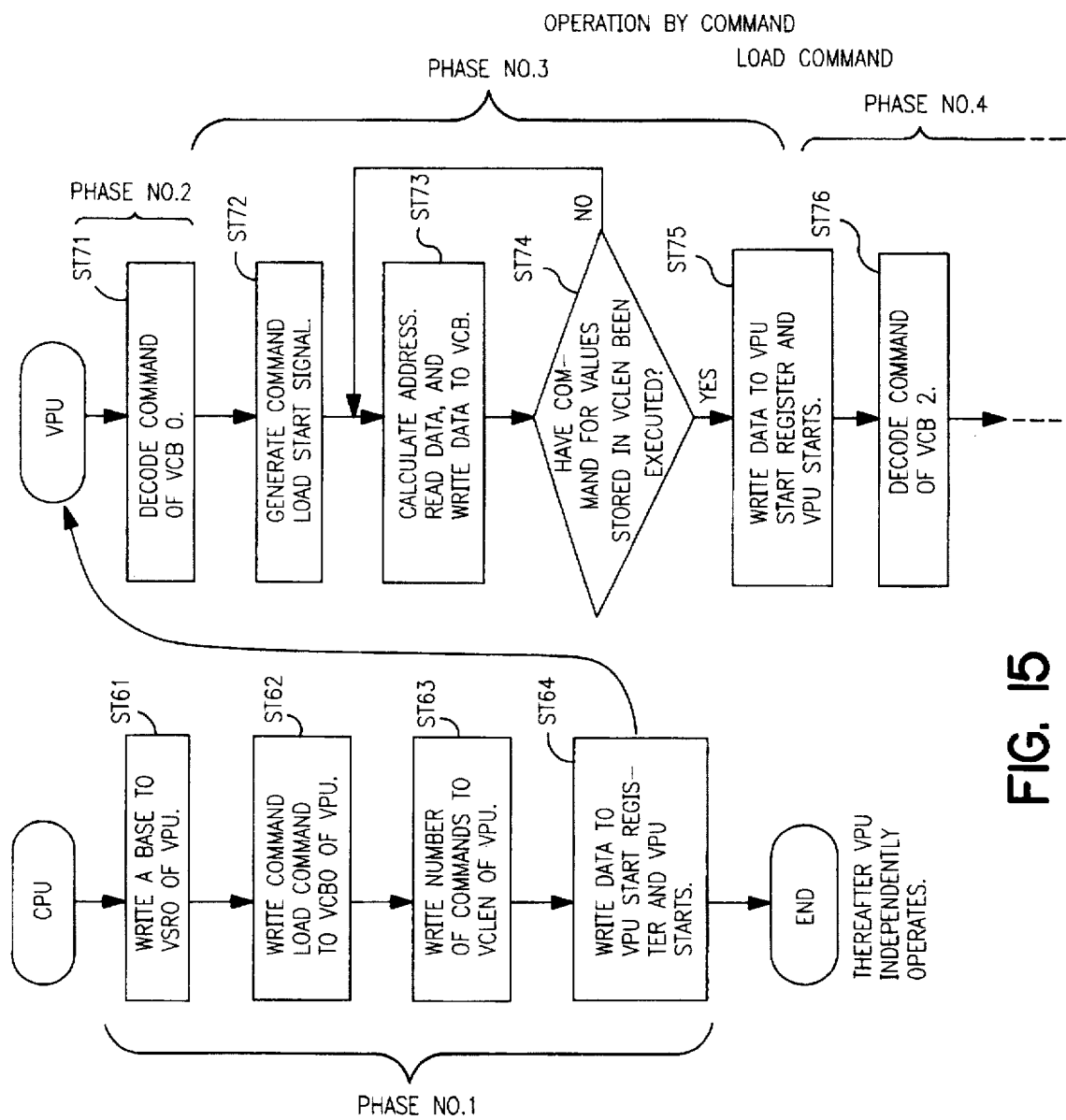
FIG. 15 is a flow chart for explaining the operations of the CPU and VPU.
Figure 16:
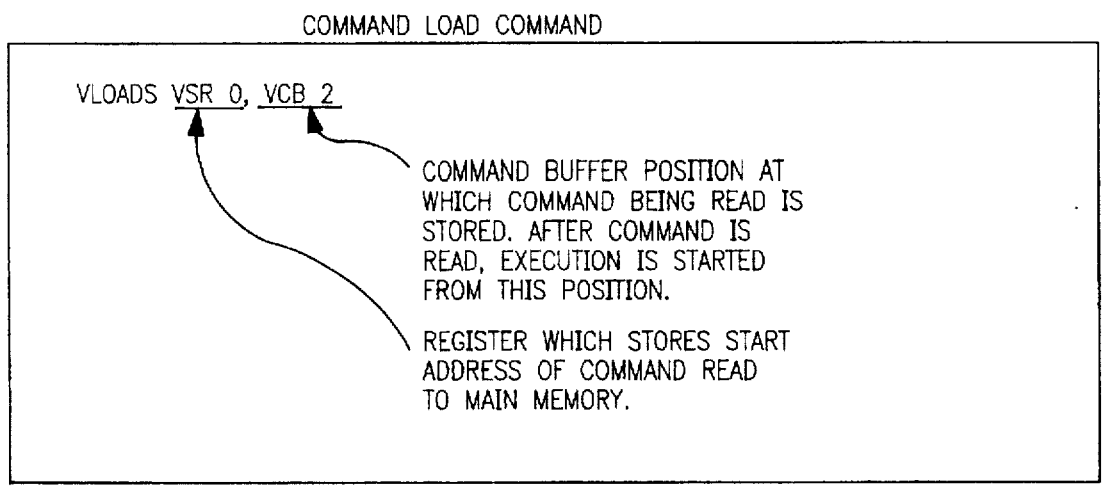
FIG. 16 is a schematic diagram for explaining a control load command.

Next, with reference to FIG. 15, the operation of the system of FIG. 14 will be described in detail. FIG. 15 shows respective process flow charts of the CPU 141 and VPU 120. The CPU 141 initializes the internal register 146 so as to cause the VPU 120 to perform a desired process. This process is performed as phase No. 1. The internal register 146 comprises a command buffer 136, a scalar register 126, a translation look aside buffer TLB, and a general purpose register 146. When the CPU 141 starts the process, at step ST61 it writes a base address $A_{BASE}$ to a register VSR0 of the scalar register 128 of the VPU 120. At step ST62, the CPU 141 stores a command load command in a register VCB0 of the command buffer 136. As shown in FIG. 16, this command consists of "VLOADS" (which represents a command load operation), a register (which stores the start address of a command to be read from the main memory), and a command buffer position or address (at which the command being read is stored).

At step ST63, the CPU 141 writes the number of commands in the register VCLEN of the internal register 146 of the VPU 120. After the steps ST61, ST62, and ST63, the initialization of the VPU 120 is completed. The steps ST61, ST62, and ST63 should not be always performed in this order. Rather, the execution order of these steps can be changed when they are followed by step ST64.

At step ST64 the start address VCB0 is stored in the start register of the VPU 120, namely, the start flag and start address portion 23 of FIG. 4. Thus, the flag becomes active. As a result, the VPU 120 executes commands from the command buffer address VCB0. After the step ST64, the CPU 141 stops the process for the VPU 121.

When the VPU 121 starts, at step ST71 it decodes a command load command stored at the address VCBO of the command buffer 136. Thereafter, the VPU 121 interprets the command load command stored (at the step ST62) and executes the command. Then, phase No. 2 starts. When the VPU 121 starts executing the command load command, at step ST72 it generates a command load start signal $S_{START}$. Thus, at step ST73 the command load control circuit 57 and the bus control circuit 60 shown in FIG. 11 calculate a relevant address, read the data, and store it in the command buffer 136. This operation is performed as phase No. 3. The step ST73 is repeated a number of times according to the value stored in the register VCLEN. When the determined result is "YES" at step ST74, at step ST75 the VPU 121 stores a start address in the start flag and start address storage portion 23. At step ST76, the VPU 121 executes commands from the start address VCB2 being loaded. This operation is performed as phase No. 4.

Figure 17:
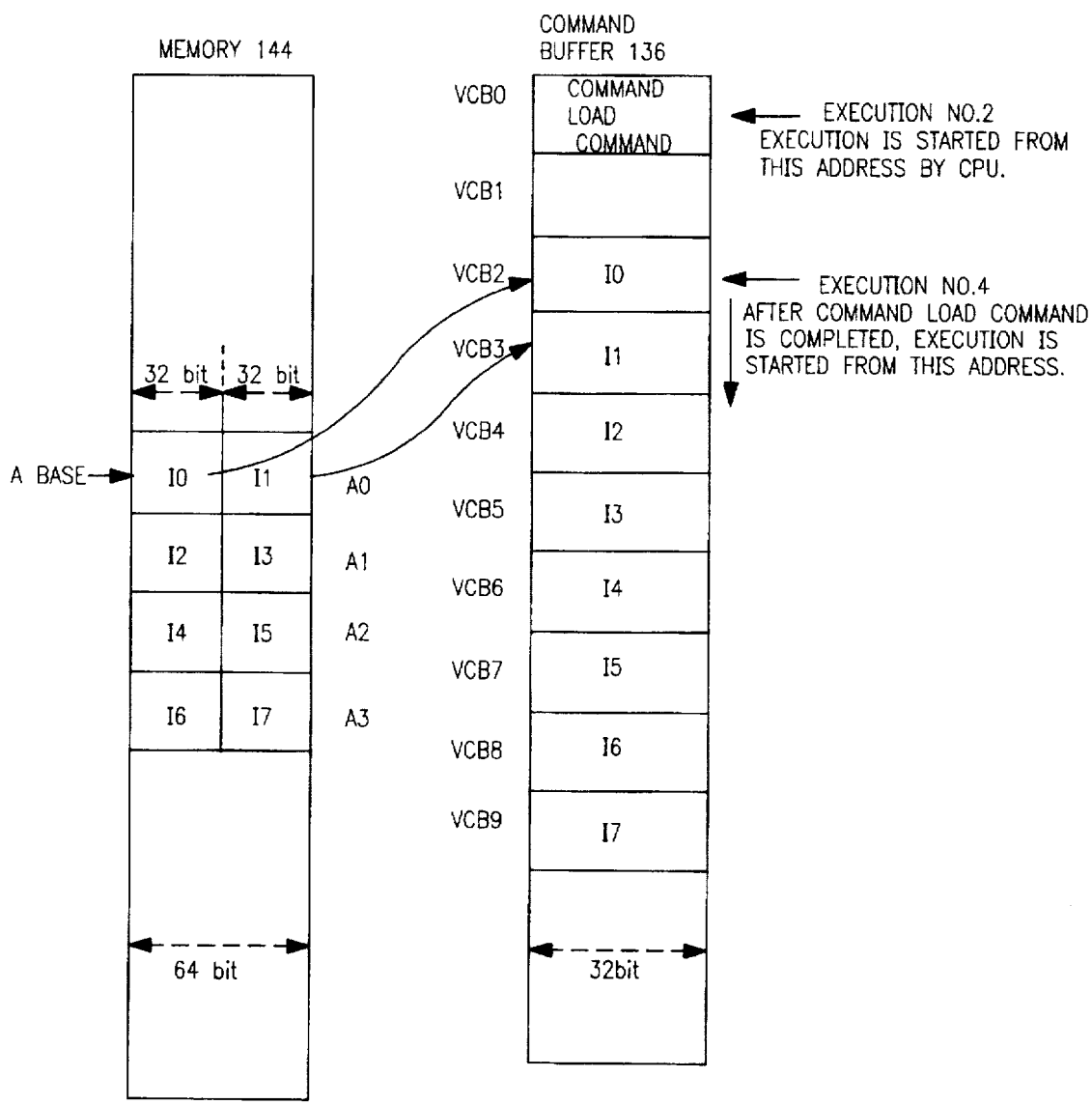
FIG. 17 is a schematic diagram for explaining a command load operation.

In the memory 144 of FIG. 14, one address is composed of data of 64 bits. In the command buffer 136, one address is composed of data of 32 bits. Thus, as shown in FIG. 17, at one address of the memory 144, commands $I_{2n}$ and $I_{2n+1}$ which are stored at two command buffers are stored. For example, at the address $A_{BASE}$ of the memory 144, commands $I_0$ and $I_1$ are stored. Thus, at the addresses VCB2 and VCB3 of the command buffer 136, commands $I_0$ and $I_1$ are stored, respectively. The memory 144 comprises a HOST CPU PROGRAM region 144-1 (which is used for the CPU 141) and VPU PROGRAM commands 144-2, each of which is composed of an operation code and an operand. An operation code of the HOST CPU PROGRAM region 144-1 is composed of a HOST CPU control program which contains a DRIVER program, a SCALAR PROCESSING program, and a VU control program. An operation code of the VPU PROGRAM region 144-2 is composed of a plurality of VU EXECUTING PROGRAM CODEs that the VPU 120 loads and executes. The operand of the VPU PROGRAM region 144-2 contains data necessary for arithmetic operations (BASE X1, Y1, Y2, ADDRX).

Figure 18:
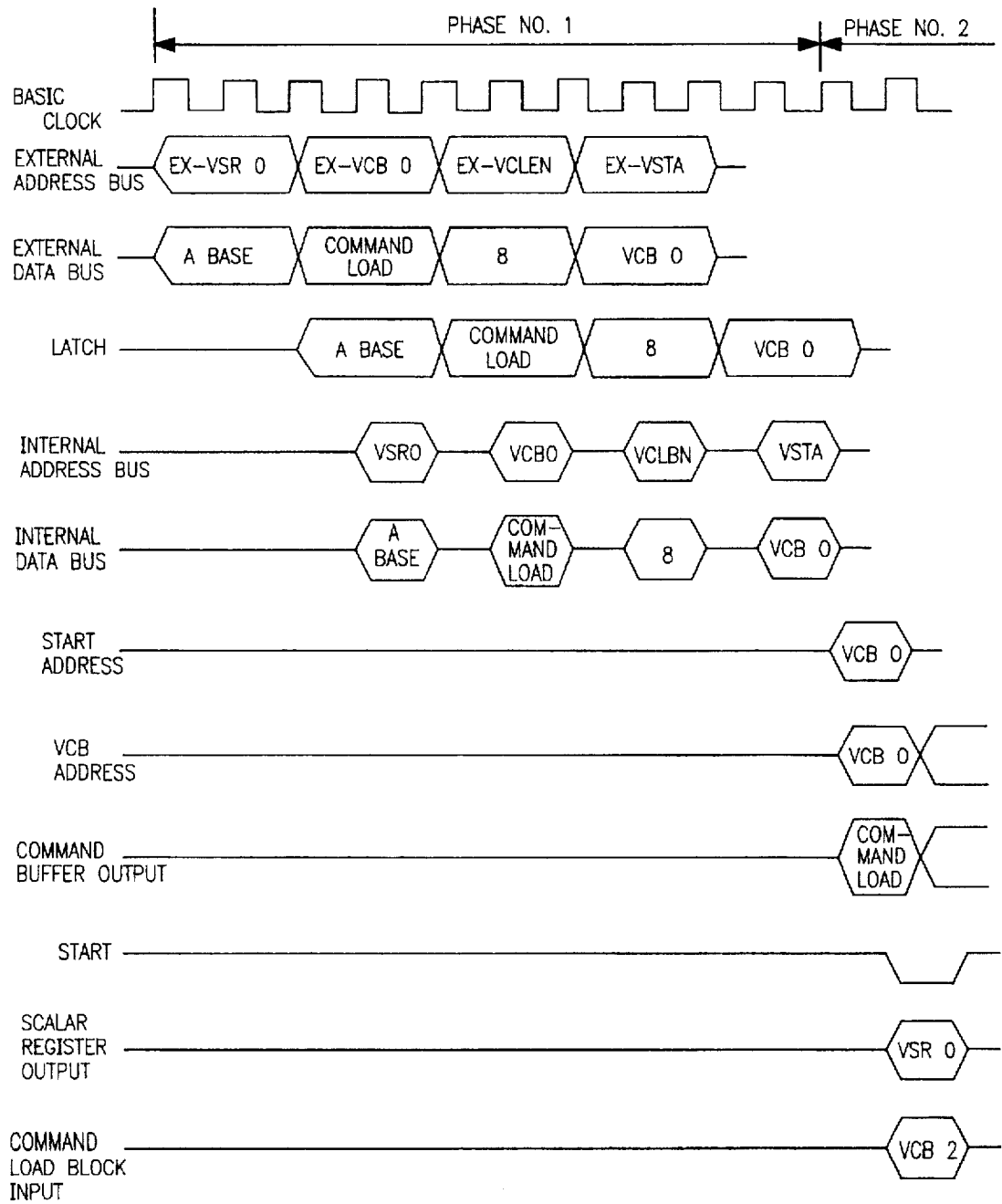
FIG. 18 is a detail timing chart of processes of phase Nos. 1 and 2 of the CPU and VPU.
Figure 19:
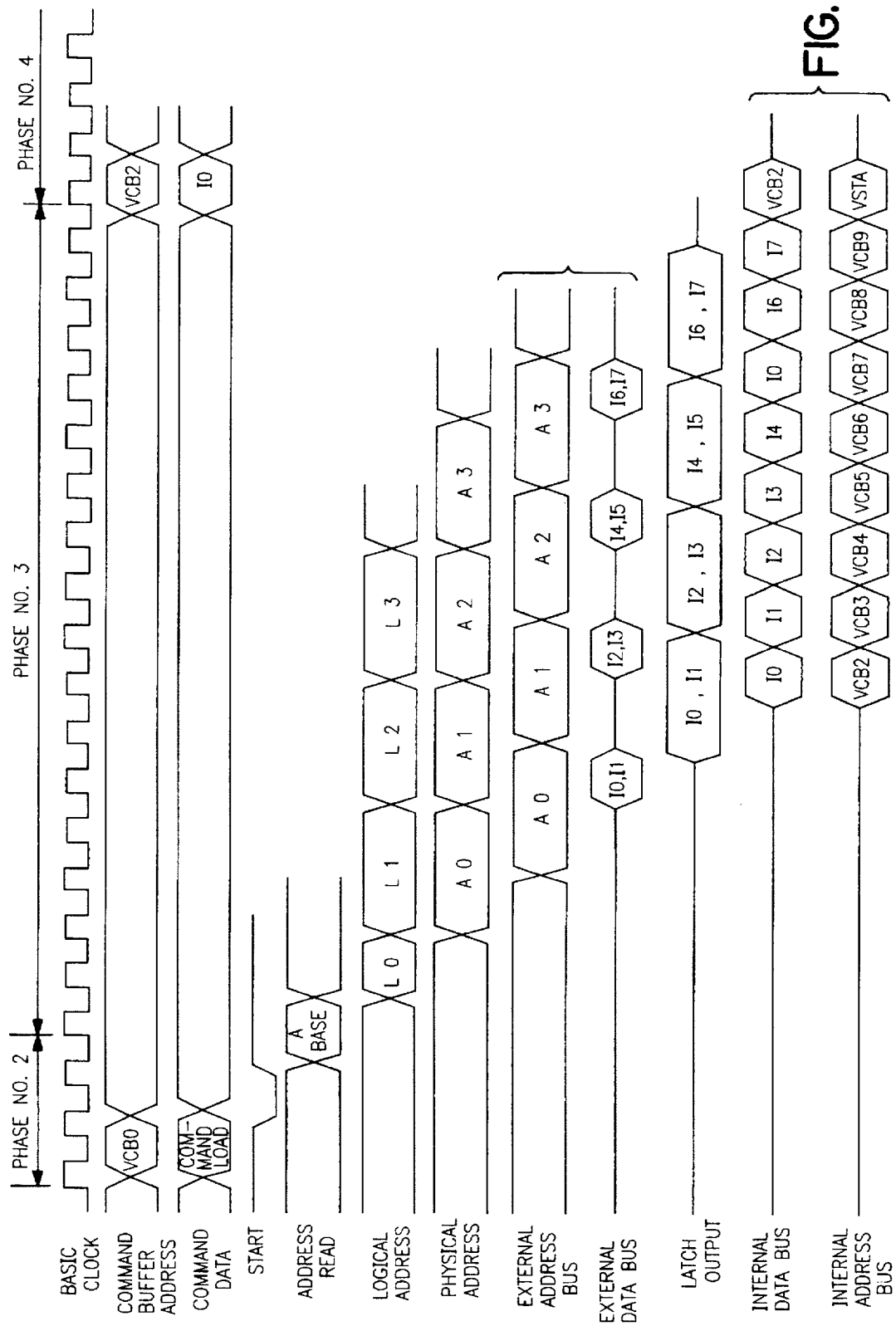
FIG. 19 is a detail timing chart of processes of phase Nos. 2 to 4 the CPU and VPU.

FIGS. 18 and 19 are detailed timing charts showing the processes of the phase Nos. 1 to 4 of the CPU 141 and VPU 120. In the example shown in these figures, when one command load command is executed, eight commands are loaded.

In the phase No. 1, an external address EX-VSR0 according to one command is sent to the external address bus ADDR. Then, an address $A_{BASE}$ is read through the external data bus. The address is stored in a latch of the bus control unit 125. Next, the CPU 141 sends to the external address bus the external address EX-VCB0 at which the command-load command is stored. Thus, the command-load command is read. While this command is being read, the latch which has read the address $A_{BASE}$ sends the address $A_{BASE}$ to the internal data bus. Under the control of the address unit 124, an address representing one register VSR0 of the scalar register 128 is outputted. Thus, the register VSR0 stores this address. This operation is performed in the period of two clock pulses. Next, the addresses EX-VCLEN and EX-VSTA are successively sent to the external address bus 117. Thus, the corresponding memory outputs "8" and "VCB0" to the external data bus 116. The latch successively reads these data and sends them to the internal data bus 118. In other words, the address $A_{BASE}$, the command load command, "8", and the start address VCB0 are sent to the internal data bus. This process accords with the steps ST61 to ST64 of FIG. 15. In addition, register addresses at which these data are stored are successively sent to the internal address bus 119. Consequently, the address $A_{BASE}$ is stored in the register VSR0; the command load command is stored in the address VCB0 of the command buffer; the "8" is stored in the register VCLEN; and the address VCB0 of the command buffer is stored in the start address register or the start flag and start address storage portion 23. When the start address is stored in the start address register, the VCB address representing the command buffer VCB0 is outputted and the command load command is read from the command buffer (this operation is performed as phase No. 2). Thus, a start request signal $S_{START}$ is outputted so as to start loading the commands. The scalar register VSR0 outputs the address $A_{BASE}$. The command-load control circuit 57 receives the address VCB2 of the command buffer 136. The phase No. 2 accords with the step ST71 of FIG. 15. After the start signal is outputted, the address $A_{BASE}$ is inputted to the register 60a of the address unit 124 and then the address unit 124 converts the received address into a physical address PA through a logical address LA and outputs it to the external address bus 117 (this operation is performed as the phase No. 3). Thus, the commands $I_0$ and $I_1$ stored at the physical address PA of the memory 144 are sent to the latch of the bus control unit 125 of the VPU 120 through the external data bus 116. This operation is performed for half the value stored in the register VCLEN of the general purpose register 142. According to the embodiment of the present invention, as shown in FIG. 17, since two commands are stored at one address of the memory 144, with half the value stored in the register VCLEN, all commands according to the value are read. Thus, in the period of two clock pulses, two commands received from the external data bus are stored in the latch of the bus control unit 125. Whenever a clock pulse takes place, these commands are outputted to the internal data bus. In addition, these commands are stored in the position of a desired command buffer address. In the phase No. 3, a total of eight commands are successively stored at the address VCB2 and later addresses of the command buffer 136. This operation is performed in the phase No. 3. After the phase No. 3 is completed, the phase No. 4 starts. In other words, as shown in FIG. 15, the VPU 120 executes commands from the address VCB2 of the command buffer 136. In this process, the command load command is executed.

Figure 20:
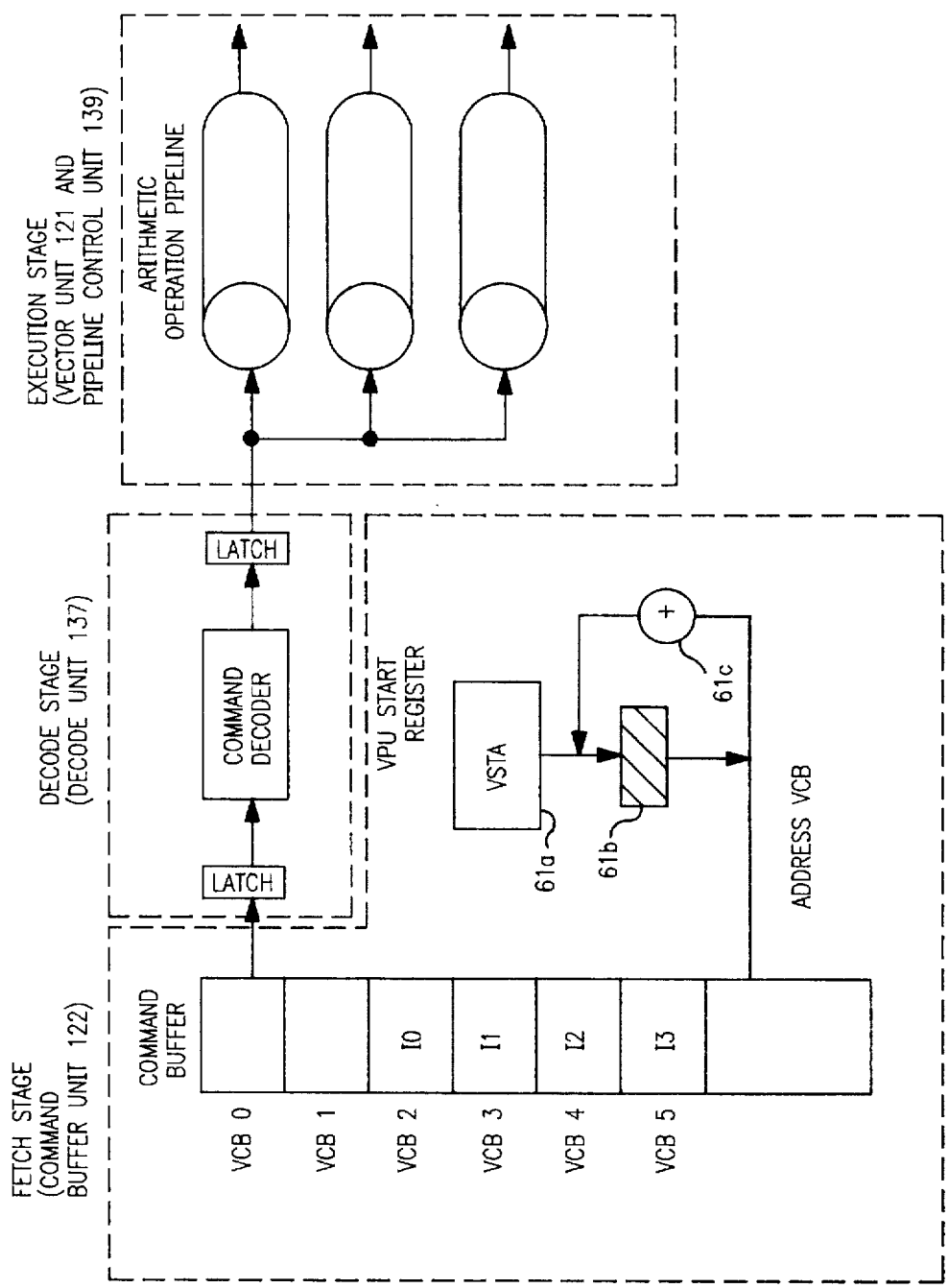
FIG. 20 is a schematic diagram for explaining a pipeline process executing commands.
Figure 21:
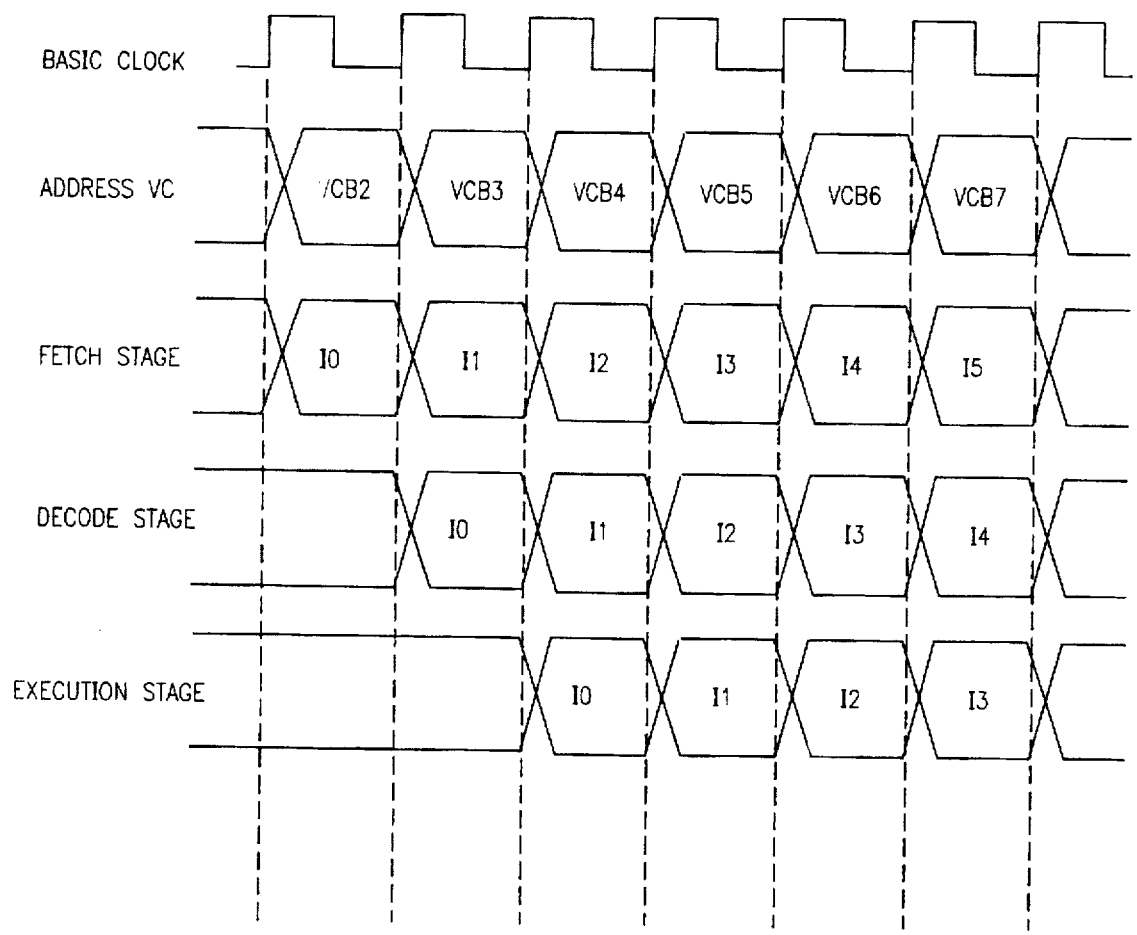
FIG. 21 is a timing chart of the pipeline process.

The above-mentioned system outputs addresses in the pipeline scheme. Corresponding data are also successively stored in the command buffer 136 in the pipeline scheme. However, in the system shown in FIGS. 13 and 14, commands are also executed in the pipeline scheme. FIG. 20 is a schematic diagram showing a pipeline process for executing commands. FIG. 21 is a timing chart of the pipeline process. The command execution functions performed by the VPU 120 can be categorized as a fetch stage, a decode stage, and an execution stage. The fetch stage is performed by the program point circuit 61 and the command buffer 136. In the decode stage, commands being read are decoded. The decode stage is performed by the decode unit 137 which comprises an input latch, a command decoder, and an output latch. In the execution stage, the decoded result is used. The execution stage is performed by the vector unit 121 and the pipeline control unit 139. Next, the pipeline process of FIGS. 15, 17, and 18 will be described. When the process is executed from the address VCB2 of the command buffer, the program point circuit 61 outputs the address VCB2. Next, the address VCB3 and commands $I_0$, $I_1$, $I_2$, $I_3$ and so forth are successively read from the command buffer. These address and commands are sent to the command decoder through the input latch. The decoded result is latched by the output latch. Thus, the execution stage in which a desired process is performed is started. In other words, as shown by the timing chart of the pipeline process of FIG. 21, the program point circuit 60 successively outputs the addresses VCB2, VCB3, and so forth. In the fetch stage, commands $I_0$, $I_1$, $I_2$, $I_3$, and so forth are outputted according to the addresses. In the decode stage, with a delay of the period of half clock pulse, the commands $I_0$, $I_1$, $I_2$, $I_3$, and so forth read from the fetch stage command buffer are decoded. In addition, with a further delay of the period of one clock pulse, in the execution stage, these commands are executed.

In the above-mentioned operation, a command sequence is loaded and then successively executed from the beginning.

The above described VPU is controlled such that (1) control is passed, by a specific command, from a scalar process to a vector process, and (2) if a vector length is larger than the length of the vector register, then the address of the main storage unit is automatically stepped up to the next address according to a vector load/vector store command. For example, as for (1), after the preprocess by the HOST CPU 141, a command to load one vector register with vector $\vec{A}$ is executed, then a command to load another vector register with vector $\vec{B}$ is executed. Next, an arithmetic operation command for performing a multiplication, for example, is executed, and the operation result is stored in another vector register. As for (2), any vector length can be designated. For example, in the embodiment of the present invention, a vector process for the vector length of 256 or more can be performed by one vector command even if the length of a vector register is 256. If the vector length exceeds 256, the vector command is executed repeatedly without an external command issued to the vector process unit each time 256 elements have been processed. Addresses in the main storage unit are stepped up for a vector load command or a vector store command.

Thus, an operation is performed repeatedly for a registers function as if they were provided infinitely.

According to the above-mentioned embodiment, a buffer which stores a particular command can be freely designated.

However, it should be noted that a particular command can be designated to a predetermined buffer. In addition, according to the above-mentioned embodiment, the number of a register for storing a base address $A_{BASE}$ is designated with an operand of a particular command, namely, in accordance with a so-called indirect addressing system. However, the base address $A_{BASE}$ can be directly designated with an operand of a particular command.

As described above, according to the present invention, a particular execution address is designated in the command storage means 11 according to a command interpreted by the command interpretation means 12 or to an operation start command. The value of the execution address can be updated by the update selection means 14 when necessary. Thus, even if a plurality of clock pulses or a branch is required to execute a command, signals representing a wait or a branch can be effectively processed.

In addition, since the co-processor can autonomously read data necessary for performing a relevant operation from the external memory, the load imposed on the host processor can be remarkably reduced and thereby the overall performance of the system can be further improved.

Although the present invention has been shown and described with respect to a best mode embodiment thereof, it should be understood by those skilled in the art that the foregoing and various other changes, omissions, and additions in the form and details thereof may be made therein without departing form the spirit and scope of the present invention.

What is claimed is:

1. A coprocessor, connected to a host processor and an external memory, the coprocessor comprising:

buffer means for storing at one time a plurality of commands and data read from the external memory according to a series of memory addresses obtained by decoding a specific instruction, which includes a code portion containing a code sequence for causing said coprocessor to load a plurality of predetermined commands and data from the external memory and an address portion containing information representing a storage location of the predetermined commands and data in the external memory;

command interpretation means for interpreting the plurality of predetermined commands and data stored in said buffer means;

address designation means for designating a particular execution addresses according to the predetermined commands interpreted by said command interpretation means or to an operation start command;

operation means for performing an operation according to the predetermined commands interpreted by said command interpretation means or to the operation start command; and update selection means for selectively updating the value of the execution addresses designated by said address designation means according to the predetermined commands interpreted by said command interpretation means.

2. The coprocessor as set forth in claim 1, wherein said update selection means comprises:

a first selector for receiving "0" and "1" and selecting one of "0" and "1"; and an adder having a first input terminal and a second input terminal, the first input terminal being adapted for receiving the output of said first selector, the second input terminal being adapted for receiving a present address, wherein said command interpretation means is adapted to cause said first selector to select "1" and said adder to output an updated address when an interpreted result from said command interpretation means is an update, and wherein said command interpretation means is adapted to cause said first selector to select "0" to output through said adder a not-updated address when the interpreted result is a wait.

3. The coprocessor as set forth in claim 2, wherein said command interpretation means is adapted to cause said first selector to first select "0" for a clock pulse period and then to select "1" for a clock pulse period to output through said adder an updated address when the interpreted result from said command interpretation means is a wait.

4. The coprocessor as set forth in claim 1, wherein said address designation means comprises a second selector having a first input terminal and a second input terminal, the first input terminal being adapted for receiving a start address, the second input terminal being adapted for receiving a branch address, said second selector being adapted to select the start address when a command is executed and to select the branch address when a branch command is executed.

5. The coprocessor as set forth in claim 1, wherein said address designation means further comprises a start flag register and a start address register, so that an address stored in said start address register can be selected when said start flag register is set from outside said processor.

6. The coprocessor as set forth in claim 1 further comprising a third selector, said third selector being disposed between said address designation means and said buffer means, wherein said third selector is adapted to select the output of said address designation means when a command is executed, and wherein said third selector is adapted to select a storage address designated from outside said processor when a command is stored in said buffer means.

7. A processor, comprising:

command buffer means for receiving and storing a particular command from a host processor, the particular command having a code portion and an address portion, said code portion containing a code sequence for causing said processor to load a plurality of predetermined commands and data from an external memory, said address portion containing information representing storage locations of the predetermined commands and data in said external memory;

command interpretation means for decoding the particular command;

address extraction means for extracting said address portion contained in the particular command according to the output of said command interpretation means;

read control means for generating a memory address sequence according to extracted information from the address portion, reading the plurality of predetermined commands and data from said external memory according to the memory address sequence, and storing the plurality of read predetermined commands and data in said command buffer means; and program pointer means for generating addresses of the plurality of predetermined commands stored in said command buffer means, and for reading the plurality of predetermined commands stored in said command buffer means.

8. The processor as set forth in claim 7,
wherein the address portion of the particular command has a first operand and a second operand, the first operand designating one of a plurality of general purpose registers used when a command is executed by said processor, and the second operand designating one region of said command buffer means.

9. The processor as set forth in claim 8,
wherein an address stored in the one of the general purpose registers designated by the first operand is an address of the external memory for storing data and commands loaded to said command buffer means, and
wherein said command buffer means is adapted to control said read control means so as to read an address command or data from the address and to store the addressed command or data in one address region of said command buffer means designated by the second operand.

10. The processor as set forth in claim 9 further comprising:
a command length register for storing the length of a command and data sequence,
wherein said command buffer means is adapted to the length of the command and data sequence stored in said command length register.

11. The processor as set forth in claim 7, further comprising:
a first address pointer for specifying an address in said command buffer means and providing said command interpretation means with a command or data stored in the area at the address, and
a second address pointer for specifying a second address in said command buffer means and storing in the area at the second address a command or data read from the external memory.

12. The processor as set forth in claim 11, further comprising:
decode means for decoding the specific instruction, wherein said read control means provides said decode means at the address specified by the first address pointer with a command or data read from an external memory and stored in said command buffer means.

13. The processor as set forth in claim 7, wherein
said processor is connected at least to a CPU system comprising an external memory and a CPU, and is operated under control of said CPU.

14. A processor, comprising:
command buffer means for receiving a particular command from a host processor and storing the particular command, the particular command having a code portion and an address portion, said code portion containing a code sequence for causing said processor to load a plurality of predetermined commands and data from an external memory, the address portion containing information representing storage locations of the plurality of predetermined commands and data in the external memory;

command interpretation means for decoding the particular command;

address extraction means for extracting the address portion contained in the particular command according to the output of said command interpretation means;

read control means for generating a memory address sequence according to information of the address portion being extracted and for reading the plurality of commands and data from said external memory according to the address sequence;

address designation means for designating a particular execution address according to the particular command interpreted by said command interpretation means after the particular command is interpreted by said command interpretation means; and update selection means for selectively updating the value of the particular execution address designated by said address designation means according to the particular command interpreted by said command interpretation means.

* * * * *